(12) United States Patent
Okano et al.

(10) Patent No.: US 6,513,383 B1
(45) Date of Patent: Feb. 4, 2003

(54) ACCELERATION SENSOR AND ACCELERATION DETECTION SYSTEM

(75) Inventors: Masami Okano, Tomioka (JP); Hideki Ishizuka, Tomioka (JP); Hiroshi Naganuma, Tomioka (JP)

(73) Assignee: Bosch Electronics Corporation, Gunma (JP)

( * ) Notice: Subject to any disclaimer, the term of this patent is extended or adjusted under 35 U.S.C. 154(b) by 0 days.

(21) Appl. No.: 09/857,449

(22) PCT Filed: Jan. 19, 2000

(86) PCT No.: PCT/JP00/00224

§ 371 (c)(1),
(2), (4) Date: Jun. 4, 2001

(87) PCT Pub. No.: WO00/45181

PCT Pub. Date: Aug. 3, 2000

(30) Foreign Application Priority Data

Jan. 26, 1999 (JP) ............................................. 11-016648

(51) Int. Cl.[7] ................................................. G01P 15/09
(52) U.S. Cl. .................................................... 73/514.34
(58) Field of Search ........................ 73/514.34, 514.33, 73/514.35

(56) References Cited

U.S. PATENT DOCUMENTS 5,629,489 A * 5/1997 Hipkiss et al. ......... 73/862.622

6,246,287 B1 * 6/2001 Yamashita .................. 330/174

FOREIGN PATENT DOCUMENTS

| JP | A6329212 | 2/1988 |
| JP | 6442460 | 3/1989 |
| JP | 2150567 | 12/1990 |
| JP | A324465 | 2/1991 |
| JP | A5249140 | 9/1993 |

* cited by examiner

Primary Examiner—Richard A. Moller
(74) Attorney, Agent, or Firm—Birch, Stewart, Kolasch & Birch, LLP

(57) ABSTRACT

The present invention relates to an acceleration sensor which can be provided in a place with extreme ambient temperature variations, for example, near a vehicle engine, and an acceleration detecting system having the acceleration sensor, which are used to control an occupant protection device such as an airbag. In an acceleration sensor (1, 40, 50, 160), gain of an amplifier circuit (4, 5, 6, 41, 42, 43, 51) which differentially amplifies outputs of a piezo-electric element (3) is adjusted by temperature compensation means (9), and thereby an output-temperature characteristic of the piezo-electric element (3) is compensated. Also, a capacitor (8) is inserted in parallel with the piezo-electric element (3), and thereby a composite capacity is increased. By this, a lower cut-off frequency is set to a lower frequency without increasing resistor values of a bias resistor circuit (7). The acceleration sensor (1, 40, 50, 160) is provided in a front part of a vehicle, and its sensor output is received by a receiving circuit (2, 80, 90, 161) provided in a vehicle room.

27 Claims, 9 Drawing Sheets

ACCELERATION SENSOR AND ACCELERATION DETECTION SYSTEM

This application is the national phase under 35 U.S.C. §371 of PCT International Application No. PCT/JP00/00224 which has an International filing date of Jan. 19, 2000, which designated the United States of America.

TECHNICAL FIELD

The present invention relates to an acceleration sensor for detecting an acceleration operating on a vehicle, and an acceleration detecting system using the acceleration sensor.

BACKGROUND ART

An acceleration sensor is widely used with an occupant protection device such as an airbag and a seat-belt tensioner. Generally, the acceleration sensor is provided on a floor tunnel in a vehicle room together with a control unit, detects an acceleration operating on a vehicle through the floor tunnel, and gives an analog signal representative of the acceleration to the control unit. The control unit decides based on the acceleration signal from the acceleration sensor and a collision decision threshold value whether to drive the occupant protection device, and controls the occupant protection device according to the decision.

By the way, when an impact of collision is absorbed by a crush of a collision part of the car body, it can be assumed that a collision acceleration transmitted to the floor tunnel is weakened. In such a case, an acceleration detected by the acceleration sensor provided on the floor tunnel is small. In particular, a collision, such as an offset collision or an oblique collision, tends to cause a case in which the acceleration transmitted to the floor tunnel is weakened. Because of this, from the viewpoint of providing the acceleration sensor near a collision part, providing the acceleration sensor at a front part of the vehicle can be considered. However, according to this, since the acceleration sensor must be provided near an engine of the vehicle, the acceleration sensor is placed under a state of directly receiving a great variation of temperature. Hence, a conventional acceleration sensor detecting an acceleration as an analog signal can not be provided.

Therefore, an object of the present invention is to provide an acceleration sensor which can be provided near an engine of an automobile.

Another object of the present invention is to provide an acceleration detecting system using the acceleration sensor.

DISCLOSURE OF INVENTION

An acceleration sensor in claim 1 comprises: a piezo-electric element for detecting an acceleration; an amplifier circuit for inputting voltage outputs of both ends of said piezo-electric element, and for giving a differential amplification signal, which is obtained by differentially amplifying the voltage outputs of both ends of said piezo-electric element, as a sensor output; a bias resistor circuit provided at an input side of said amplifier circuit; a capacitor inserted in parallel with said piezo-electric element in order to lower a lower cut-off frequency without increasing resistance values of said bias resistor circuit; temperature compensation means for adjusting gain of said amplifier circuit so that an output-temperature characteristic of said piezo-electric element is compensated; and a reference voltage circuit for giving a reference potential to said amplifier circuit and said bias resistor circuit.

According to a composition like this, the output fluctuations of the piezo-electric element due to variations in ambient temperature are compensated by the gain adjustment of the amplifier circuits by means of the temperature compensation means. Accordingly, even when the acceleration sensor is provided in a place with extreme ambient temperature variations such that it directly receives heat from a vehicle engine, the sensor output of the acceleration sensor does not fluctuate by variations in ambient temperature. Also, by inserting the capacitor in parallel with the piezo-electric element, the composite capacity is increased. By this, the lower cut-off frequency can be lowered without increasing resistance values of the bias resistor circuit.

In the acceleration sensor of claim 2 having a connection with the composition of claim 1, a capacity of said capacitor is set so that resistors of said bias resistor circuit become values that can be used in a normal atmosphere and so that the lower cut-off frequency becomes a low value in which velocity variations can easily be detected. By this, the acceleration sensor can give a lower frequency component, and thereby the sensor output that facilitates a collision decision can be given. Also, it is not necessary to set resistors of the bias resistor circuit to such high resistance values that cannot be used in an ordinary atmosphere. Further, migration in the piezo-electric element, occurring by setting the resistors of the bias resistor circuit to high resistance values, can be prevented.

In the acceleration sensor of claim 3 having a connection with the composition of claim 1, said amplifier circuit has a first non-inverting amplifier circuit for non-inversion amplifying one voltage of said piezo-electric element, a second non-inverting amplifier circuit for non-inversion amplifying the other voltage of said piezo-electric element, and a differential amplifier circuit for differentially amplifying outputs of said first and second non-inverting amplifier circuits; and said temperature compensation means is a single temperature compensation element for adjusting gains of said first and second non-inverting amplifier circuits. In the acceleration sensor of claim 4 having a connection with the composition of claim 3, said first non-inverting amplifier circuit has a first operational amplifier, one input terminal of the first operational amplifier being connected to one end of said piezo-electric element, and the other input terminal of the first operational amplifier being connected to an output terminal of the first operational amplifier through a first resistor; said second non-inverting amplifier circuit has a second operational amplifier, one input terminal of the second operational amplifier being connected to the other end of said piezo-electric element, and the other input terminal of the second operational amplifier being connected to an output terminal of the second operational amplifier through a second resistor; and said temperature compensation element is inserted between the other input terminal of the first operational amplifier and the other input terminal of the second operational amplifier, and decreases the gains of the first and second operational amplifiers when temperature rises and increases the gains when temperature drops. According to compositions like these, since the gains of the first and second non-inverting amplifier circuits are adjusted by the single temperature compensation element, decrement in the number of elements and simplification of circuit composition can be achieved.

In the acceleration sensor of claim 5 having a connection with the composition of claim 4, said first and second resistors are set so that a drop in voltage outputs of said piezo-electric element due to the parallel insertion of said capacitor to said piezo-electric element can be supplemented by the gains of said first and second non-inverting amplifier circuits. By this, since the drop in the voltage outputs of said piezo-electric element is supplemented, it is possible to obtain a desired sensor output.

In the acceleration sensor of claim 6 having a connection with the composition of claim 5, said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and gives the reference potential to at least said differential amplifier circuit by way of the reference voltage buffer amplifier. By this, since a common mode rejection ratio of the differential amplifier circuit becomes large, an influence of offset voltage due to the gain increment of the first and second non-inverting amplifier circuits is suppressed by the differential amplifier circuit.

In the acceleration sensor of claim 7 having a connection with the composition of claim 1, a sensor power supply line to which a constant voltage is supplied from outside is further included, an output terminal of said amplifier circuit is grounded through an output resistor, and the sensor output given from said amplifier circuit is output as current variations in said sensor power supply line. Because of this, it is not necessary to provide a signal line. Also, since it is not necessary to use a ground potential by car body grounding as a reference, noise prevention can be done more effectively.

In the acceleration sensor of claim 8 having a connection with the composition of claim 1, a sensor power supply line to which a constant voltage is supplied from outside, a sensor output signal line for outputting the sensor output of said amplifier circuit, and a reference voltage signal line for outputting the reference potential of said reference voltage circuit are further included, and the sensor output given from said amplifier circuit is output as a voltage signal by means of said sensor output signal line and said reference voltage signal line. According to this, even when the voltage of the sensor power supply line fluctuates for some reason or other, since the sensor output of the amplifier circuit and the reference potential of the reference voltage circuit fluctuate together with the voltage of the sensor power supply line, the voltage fluctuation in the sensor power supply line can be cancelled.

In the acceleration sensor of claim 9 having a connection with the composition of claim 1, said amplifier circuit, which has an integrating function, differentially amplifies and integrates the voltage outputs of both ends of said piezo-electric element, and gives an integrated differential amplification signal as the sensor output. In the acceleration sensor of claim 10 having a connection with the composition of claim 9, said amplifier circuit has a first non-inverting amplifier circuit for non-inversion amplifying one voltage of said piezo-electric element, a second non-inverting amplifier circuit for non-inversion amplifying the other voltage of said piezo-electric element, and a differential amplifier circuit for differentially amplifying outputs of said first and second non-inverting amplifier circuits, said first and second non-inverting amplifier circuits and/or said differential amplifier circuit having the integrating function. In the acceleration sensor of claim 11 having a connection with the composition of claim 10, said first non-inverting amplifier circuit has a first operational amplifier, one input terminal of the first operational amplifier being connected to one end of said piezo-electric element, and the other input terminal of the first operational amplifier being connected to an output terminal of the first operational amplifier through a parallel connection of a first resistor and a first capacitor; and said second non-inverting amplifier circuit has a second operational amplifier, one input terminal of the second operational amplifier being connected to the other end of said piezo-electric element, and the other input terminal of the second operational amplifier being connected to an output terminal of the second operational amplifier through a parallel connection of a second resistor and a second capacitor. In the acceleration sensor of claim 12 having a connection with the composition of claim 10, said differential amplifier circuit has a third operational amplifier, one input terminal of the third operational amplifier being connected to an output terminal of said second non-inverting amplifier circuit through a third resistor and being also connected to said reference voltage circuit through a parallel connection of a fourth resistor and a third capacitor, and the other input terminal of the third operational amplifier being connected to an output terminal of said first non-inverting amplifier circuit through a fifth resistor and being also connected to an output terminal of the third operational amplifier through a parallel connection of a sixth resistor and a fourth capacitor. According to compositions like these, since the integrated value of an acceleration is given as the sensor output, it is not necessary to execute an integration processing of the sensor output in a control unit receiving the sensor output. Because of this, a composition of the control unit can be simplified, and a processing speed of control can be risen.

In the acceleration sensor of claim 13 having a connection with the composition of claim 1, the acceleration sensor further comprises: a circuit base board, an acceleration sensor circuit which has said piezo-electric element, said amplifier circuit, said bias resistor circuit, said capacitor, said temperature compensation means and said reference voltage circuit being mounted on said circuit base board; a metallic shielding case having a container shape with an opened upper face, said circuit base board being fixed to the upper face of said shielding case so that a face of said circuit base board having the acceleration sensor circuit becomes inside said shielding case; and a plastic housing having a container chamber which houses said shielding case, wherein said shielding case is formed so that a width of said shielding case in acceleration detecting directions is a little larger than a width of the container chamber of said housing, and side walls of said shielding case meeting at right angle to the acceleration detecting directions pressure-contact with an inside face of said container chamber. According to a composition like this, since the side walls of the shielding case meeting at right angle to the acceleration detecting directions are in the pressure-contact with the container chamber of the housing, an acceleration is directly transmitted from the housing to the shielding case. Because of this, dispersion in a sensor performance due to dispersion in a gap between the shielding case and the container camber can be prevented.

In the acceleration sensor of claim 14 having a connection with the composition of claim 1, the acceleration sensor further comprises: a circuit base board, an acceleration sensor circuit which has said piezo-electric element, said amplifier circuit, said bias resistor circuit, said capacitor, said temperature compensation means and said reference voltage circuit being mounted on said circuit base board; and a plastic housing having a container chamber of which an inside face is covered with a metallic layer for shielding, wherein said circuit base board is fixed to an upper face of said container chamber so that a face of said circuit base board having the acceleration sensor circuit becomes inside said container chamber. According to this, since there is no need of using a metallic shielding case, it is possible to reduce the number of parts and weight of the acceleration sensor.

An acceleration sensor in claim 15 comprises: a piezo-electric element for detecting an acceleration; an amplifier circuit for inputting voltage outputs of both ends of said piezo-electric element, for differentially amplifying and integrating the voltage outputs of both ends, and for outputting an integrated differential amplification signal; a bias resistor circuit provided at an input side of said amplifier circuit; a capacitor inserted in parallel with said piezo-electric element in order to lower a lower cut-off frequency without increasing resistance values of said bias resistor circuit; temperature compensation means for adjusting gain of said amplifier circuit so that an output-temperature characteristic of said piezo-electric element is compensated; a reference voltage circuit for giving a reference potential to said amplifier circuit and said bias resistor circuit; and at least one comparison circuit for inputting the integrated differential amplification signal of said amplifier circuit, for giving a comparison output based on the integrated differential amplification signal and a prescribed threshold value, and for giving the comparison output as a sensor output.

According to a composition like this, similarly to the acceleration sensor of claim 1, even when the acceleration sensor is provided in a place with extreme ambient temperature variations such that it directly receives heat from a vehicle engine, the sensor output of the acceleration sensor does not fluctuate by variations in ambient temperature. Also, the lower cut-off frequency can be lowered without increasing resistance values of the bias resistor circuit. Furthermore, according to the acceleration sensor in claim 15, since a collision signal is directly given by the comparison output, a composition of the control unit receiving the sensor output can be further simplified.

In the acceleration sensor of claim 16 having a connection with the composition of claim 15, a capacity of said capacitor is set so that resistors of said bias resistor circuit become values that can be used in a normal atmosphere and so that the lower cut-off frequency becomes a low value in which velocity variations can easily be detected. By this, the acceleration sensor can give a lower frequency component, and thereby the sensor output that facilitates a collision decision can be given. Also, it is not necessary to set resistors of the bias resistor circuit to such high resistance values that cannot be used in an ordinary atmosphere. Further, migration in the piezo-electric element, occurring by setting the resistors of the bias resistor circuit to high resistance values, can be prevented.

In the acceleration sensor of claim 17 having a connection with the composition of claim 15, said amplifier circuit has a first non-inverting amplifier circuit for non-inversion amplifying one voltage of said piezo-electric element, a second non-inverting amplifier circuit for non-inversion amplifying the other voltage of said piezo-electric element, and a differential amplifier circuit for differentially amplifying outputs of said first and second non-inverting amplifier circuits, said first and second non-inverting amplifier circuits and/or said differential amplifier circuit having the integrating function; and said temperature compensation means is a single temperature compensation element for adjusting gains of said first and second non-inverting amplifier circuits. According to these, since the gains of the first and second non-inverting amplifier circuits are adjusted by the single temperature compensation element, decrement in the number of elements and simplification of circuit composition can be achieved.

In the acceleration sensor of claim 18 having a connection with the composition of claim 17, the gains of said first and second non-inverting amplifier circuits are set so that a drop in voltage outputs of said piezo-electric element due to the parallel insertion of said capacitor to said piezo-electric element can be supplemented by the gains of said first and second non-inverting amplifier circuits. By this, since the drop in the voltage outputs of said piezo-electric element is supplemented, it is possible to obtain a desired sensor output.

In the acceleration sensor of claim 19 having a connection with the composition of claim 18, said reference voltage circuit has a reference voltage buffer amplifier for matching with output impedances of said first and second non-inverting amplifier circuits, and gives the reference potential to at least said differential amplifier circuit by way of the reference voltage buffer amplifier. By this, since a common mode rejection ratio of the differential amplifier circuit becomes large, an influence of offset voltage due to the gain increment of the first and second non-inverting amplifier circuits is suppressed by the differential amplifier circuit.

In the acceleration sensor of claim 20 having a connection with the composition of claim 15, said comparison circuit includes: a comparator for inputting the integrated differential amplification signal of said amplifier circuit and a constant voltage giving the threshold value, for giving a first level signal when the integrated differential amplification signal is below the threshold value, and for giving a second level signal when the integrated differential amplification signal exceeds the threshold value; and a chattering prevention circuit for providing the second level signal as feedback to an input side of said comparator receiving the integrated differential amplification signal when the integrated differential amplification signal exceeds the threshold value. According to this, since chattering of the comparator can be prevented without varying a reference voltage of a comparator, a circuit composition becomes simple.

In the acceleration sensor of claim 21 having a connection with the composition of claim 20, a first comparison circuit with a first threshold value and a second comparison circuit with a second threshold value different from the first threshold value are included as said comparison circuit, and a first and second comparison outputs are given as the sensor output based on comparison between the integrated differential amplification signal and the first and second threshold values. According to this, since a time interval between the first comparison output and the second comparison output becomes small under a high-speed collision and becomes large under a low-speed collision, it is possible to give the sensor output including information representative of an extent of collision. Because of this, it is possible to control an occupant protection device such as an airbag more exactly.

In the acceleration sensor of claim 22 having a connection with the composition of claim 20, a sensor power supply line to which a constant voltage is supplied from outside is further included, said comparison circuit includes a switching element inserted between said sensor power supply line and the ground, and said comparison output is output as current variations in said sensor power supply line by turning On/Off said switching element with said first and second level signals. Because of this, it is not necessary to provide a signal line. Also, since it is not necessary to use a ground potential by car body grounding as a reference, noise prevention can be done more effectively.

In the acceleration sensor of claim 23 having a connection with the composition of claim 15, the acceleration sensor further comprises: a circuit base board, an acceleration sensor circuit which has said piezo-electric element, said amplifier circuit, said bias resistor circuit, said capacitor, said temperature compensation means, said reference voltage circuit and said comparison circuit being mounted on said circuit base board; a metallic shielding case having a container shape with an opened upper face, said circuit base board being fixed to the upper face of said shielding case so that a face of said circuit base board having the acceleration sensor circuit becomes inside said shielding case; and a plastic housing having a container chamber which houses said shielding case, wherein said shielding case is formed so that a width of said shielding case in acceleration detecting directions is a little larger than a width of the container chamber of said housing, and side walls of said shielding case meeting at right angle to the acceleration detecting directions pressure-contact with an inside face of said container chamber. According to a composition like this, since the side walls of the shielding case meeting at right angle to the acceleration detecting directions are in the pressure-contact with the container chamber of the housing, an acceleration is directly transmitted from the housing to the shielding case. Because of this, dispersion in a sensor performance due to dispersion in a gap between the shielding case and the container camber can be prevented.

In the acceleration sensor of claim 24 having a connection with the composition of claim 15, the acceleration sensor further comprises: a circuit base board, an acceleration sensor circuit which has said piezo-electric element, said amplifier circuit, said bias resistor circuit, said capacitor, said temperature compensation means, said reference voltage circuit and said comparison circuit being mounted on said circuit base board; and a plastic housing having a container chamber of which an inside face is covered with a metallic layer for shielding, wherein said circuit base board is fixed to an upper face of said container chamber so that a face of said circuit base board having the acceleration sensor circuit becomes inside said container chamber. According to this, since there is no need of using a metallic shielding case, it is possible to reduce the number of parts and weight of the acceleration sensor.

In the acceleration sensor of claim 25 having a connection with the composition of claim 13 or 14 or 23 or 24, a metallic layer for shielding is formed on a face opposite to the face of said circuit base board having the acceleration sensor circuit. According to this, electromagnetic interference can be prevented more effectively.

An acceleration detecting system in claim 26 comprises: an acceleration sensor provided in a front part of a vehicle, said acceleration sensor having a piezo-electric element for detecting an acceleration, an amplifier circuit for inputting voltage outputs of both ends of said piezo-electric element, and for giving a differential amplification signal, which is obtained by differentially amplifying the voltage outputs of both ends of said piezo-electric element, as a sensor output, bias resistor circuit provided at an input side of said amplifier circuit, a capacitor inserted in parallel with said piezo-electric element in order to lower a lower cut-off frequency without increasing resistance values of said bias resistor circuit, temperature compensation means for adjusting gain of said amplifier circuit so that an output-temperature characteristic of said piezo-electric element is compensated, reference voltage circuit for giving a reference potential to said amplifier circuit and said bias resistor circuit, and a sensor power supply line to which a constant voltage is supplied from outside, said acceleration sensor outputting the sensor output given from said amplifier circuit as current variations in said sensor power supply line; a transmission cable of which one end is connected to said sensor power supply line; and a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by detecting current variations in said unit power supply line.

According to a composition like this, the acceleration sensor is provided in the front part of the vehicle, and the sensor output of the acceleration sensor is received by the receiving circuit provided in the vehicle room. Since the acceleration sensor is provided in the vehicle front, even when a collision acceleration transmitted to a floor tunnel in the vehicle room is weakened, it is possible to detect the collision acceleration quickly. Also, since the sensor output of the acceleration sensor is given as the current variations in the power supply line to the receiving circuit, there is no need of providing a signal line, and thereby simplification of a composition can be achieved. Furthermore, since it is not necessary to use a ground potential by car body grounding as a reference, noise prevention can be done more effectively.

In the acceleration detecting system of claim 27 having a connection with the composition of claim 26, said amplifier circuit of said acceleration sensor, which has an integrating function, differentially amplifies and integrates the voltage outputs of both ends of said piezo-electric element, and gives an integrated differential amplification signal as the sensor output. According to a composition like this, since an integrated value of an acceleration is given as the sensor output, it is not necessary to execute an integration processing of the sensor output in a control unit receiving the sensor output. Because of this, a composition of the control unit can be simplified, and a processing speed can be risen.

An acceleration detecting system in claim 28 comprises: an acceleration sensor provided in a front part of a vehicle, said acceleration sensor having a piezo-electric element for detecting an acceleration, an amplifier circuit for inputting voltage outputs of both ends of said piezo-electric element, for differentially amplifying and integrating the voltage outputs of both ends, and for outputting an integrated differential amplification signal, a bias resistor circuit provided at an input side of said amplifier circuit, a capacitor inserted in parallel with said piezo-electric element in order to lower a lower cut-off frequency without increasing resistance values of said bias resistor circuit, temperature compensation means for adjusting gain of said amplifier circuit so that an output-temperature characteristic of said piezo-electric element is compensated, a reference voltage circuit for giving a reference potential to said amplifier circuit and said bias resistor circuit, at least one comparison circuit for inputting the integrated differential amplification signal of said amplifier circuit, for giving a comparison output based on the integrated differential amplification signal and a prescribed threshold value, and for giving the comparison output as a sensor output, and a sensor power supply line to which a constant voltage is supplied from outside, said acceleration sensor outputting the sensor output given from said comparison circuit as current variations in said sensor power supply line; a transmission cable of which one end is connected to said sensor power supply line; and a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by detecting current variations in said unit power supply line.

According to a composition like this, similarly to the acceleration detecting system of claim 26, even when the collision acceleration transmitted to the floor tunnel in the vehicle room is weakened, it is possible to detect the collision acceleration quickly. Also, there is no need of providing a signal line, and it is not necessary to use a ground potential by car body grounding as a reference. Furthermore, according to the acceleration detecting system of claim 28, since a collision signal is directly given by the comparison output, a composition of the control unit in which the receiving circuit is provided can be further simplified.

In the acceleration detecting system of claim 29 having a connection with the composition of claim 26 or 27 or 28, said receiving circuit has: a current mirror circuit, inserted between said unit power supply line and said transmission cable, for giving a current output according to the current variations due to the sensor output of said acceleration sensor; and a detection resistor, inserted between an output side of said current mirror circuit and the ground, for outputting a voltage signal according to the current output of said current mirror circuit.

In the acceleration detecting system of claim 30 having a connection with the composition of claim 26 or 27 or 28, said receiving circuit has: a transistor, at its base being connected through a first resistor to said unit power supply line and being also connected to said transmission cable, and at its emitter being connected through a second resistor to said unit power supply line, said transistor giving a collector current according to the current variations due to the sensor output of said acceleration sensor; and a detection resistor, inserted between a collector of said transistor and the ground, for outputting a voltage signal according to the collector current of said transistor.

In the acceleration detecting system of claim 31 having a connection with the composition of claim 26 or 27 or 28, said receiving circuit has: a resistor, at its one end being connected to said transmission cable, and at its the other end being connected to said unit power supply line; a constant-current circuit, when a current flowing through said resistor varies by the sensor output of said acceleration sensor, for giving a current output according to variations of the current flowing through said resistor; and a detection resistor, inserted between an output side of said constant-current circuit and the ground, for outputting a voltage signal according to the current output of said constant-current circuit.

An acceleration detecting system in claim 32 comprises: an acceleration sensor provided in a front part of a vehicle, said acceleration sensor having a piezo-electric element for detecting an acceleration, an amplifier circuit for inputting voltage outputs of both ends of said piezo-electric element, and for giving a differential amplification signal, which is obtained by differentially amplifying the voltage outputs of both ends of said piezo-electric element, as a sensor output, a bias resistor circuit provided at an input side of said amplifier circuit, a capacitor inserted in parallel with said piezo-electric element in order to lower a lower cut-off frequency without increasing resistance values of said bias resistor circuit, temperature compensation means for adjusting gain of said amplifier circuit so that an output-temperature characteristic of said piezo-electric element is compensated, a reference voltage circuit for giving a reference potential to said amplifier circuit and said bias resistor circuit, a sensor power supply line to which a constant voltage is supplied from outside, a sensor output signal line for outputting the sensor output of said amplifier circuit, and a reference voltage signal line for outputting the reference potential of said reference voltage circuit; a transmission cable of which one end is connected to said sensor power supply line, said sensor output signal line and said reference voltage signal line; and a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by differentially amplifying the sensor output of said acceleration sensor and the reference potential.

According to a composition like this, similarly to the acceleration detecting system of claim 26, even when the collision acceleration transmitted to the floor tunnel in the vehicle room is weakened, it is possible to detect the collision acceleration quickly. Furthermore, according to the acceleration detecting system of claim 32, even when the voltage of the sensor power supply line fluctuates for some reason or other, since the sensor output of the amplifier circuit and the reference potential of the reference voltage circuit fluctuate together with the voltage of the sensor power supply line, the voltage fluctuation in the sensor power supply line is cancelled by the differential amplification of the receiving circuit.

BEST MODE FOR CARRYING OUT THE INVENTION

Figure 1:
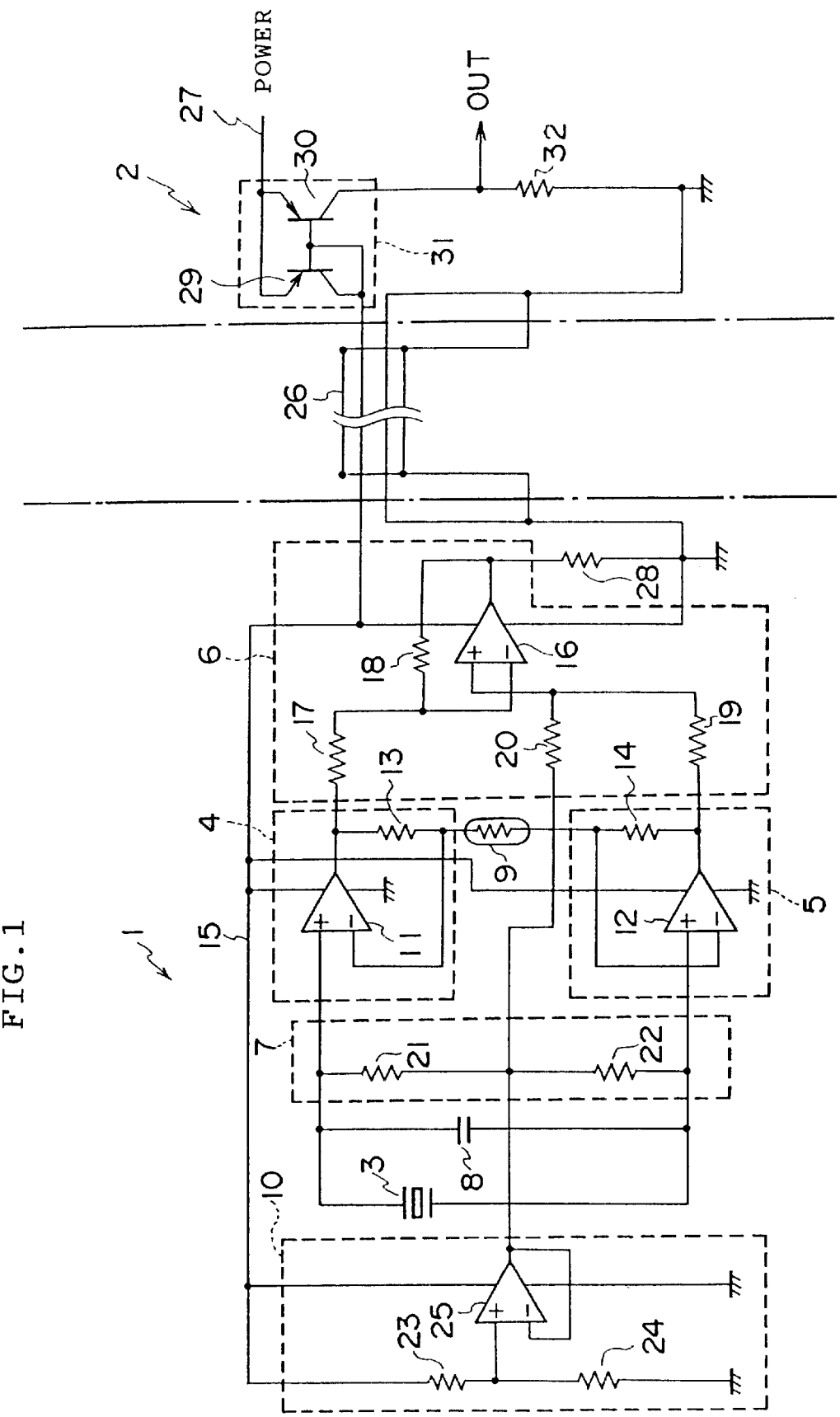
FIG. 1 is a circuit diagram showing an embodiment of an acceleration sensor and an acceleration detecting system according to the present invention.

FIG. 1 is a circuit diagram showing an embodiment of an acceleration sensor and an acceleration detecting system according to the present invention.

In FIG. 1, a reference numeral 1 is an acceleration sensor, and a reference numeral 2 is a receiving circuit. The acceleration sensor 1 is provided at a front part of a vehicle, for example, a radiator mount maintaining a radiator. The acceleration sensor 1 detects an acceleration operating to the vehicle, and gives an analog signal representative of the acceleration to the receiving circuit 2. The receiving circuit 2 is a receiving portion of a control unit which controls an occupant protection device such as an airbag and a seat-belt tensioner, and is provided on a floor tunnel in the vehicle room. The receiving circuit 2 receives the analog signal output of the acceleration sensor 1, and outputs an received signal to a rearward-stage circuit of the control unit.

The acceleration sensor 1 includes a piezo-electric element 3 for detecting the acceleration, an amplifier circuit having first and second non-inverting amplifier circuit 4 and 5 and a differential amplifier circuit 6, a bias resistor circuit 7, a capacitor 8, a temperature compensation element 9 as temperature compensation means, and a reference voltage circuit 10.

The first non-inverting amplifier circuit 4 of the amplifier circuit has a bipolar transistor type operational amplifier 11 and a resistor 13 inserted between a negative input terminal and an output terminal of the operational amplifier 11. The second non-inverting amplifier circuit 5 of the amplifier circuit has a bipolar transistor type operational amplifier 12 and a resistor 14 inserted between a negative input terminal and an output terminal of the operational amplifier 12. An operating power source of the operational amplifiers 11 and 12 is supplied from a sensor power supply line 15. As described below, the control unit supplies a predetermined constant voltage to the sensor power supply line 15 by way of the receiving circuit 2. A positive input terminal of the operational amplifier 11 of the first non-inverting amplifier circuit 4 is connected to one end of the piezo-electric element 3, and a positive input terminal of the operational amplifier 12 of the second non-inverting amplifier circuit 5 is connected to the other end of the piezo-electric element 3. By this, voltages at both ends of the piezo-electric element 3 are non-inversion amplified and converted to low impedances by the first and second non-inverting amplifier circuits 4 and 5, respectively. Since the voltage outputs of the piezo-electric element 3 are lowered by a parallel insertion of the capacitor 8 to the piezo-electric element 3 as described below, the resistors 13 and 14 of the first and second non-inverting amplifier circuits 4 and 5 are set to relatively high value so that decrement in the voltage outputs of the piezo-electric element 3 can be supplemented by gains of the operational amplifiers 11 and 12.

The differential amplifier circuit 6 of the amplifier circuit has a bipolar transistor type operational amplifier 16. An operating power source of the operational amplifier 16 is supplied from the sensor power supply line 15. A negative input terminal of the operational amplifier 16 is connected through a resistor 17 to the output terminal of the operational amplifier 11 of the first non-inverting amplifier circuit 4, and is also connected to an output terminal of the operational amplifier 16 through a resistor 18. A positive input terminal of the operational amplifier 16 is connected through a resistor 19 to the output terminal of the operational amplifier 12 of the second non-inverting amplifier circuit 5, and also receives a reference potential from the reference voltage circuit 10 through a resistor 20. The differential amplifier circuit 6 differentially amplifies the output of the first non-inverting amplifier circuit 4 and the output of the second non-inverting amplifier circuit 5, and outputs an acceleration signal. As described below, the reference potential given from the reference voltage circuit 10 to the differential amplifier circuit 6 is given by way of a reference voltage buffer amplifier 25 so as to match with output impedances of the first and second non-inverting amplifier circuits 4 and 5. By this, a common mode rejection ratio of the differential amplifier circuit 6 becomes large. Accordingly, an influence of offset voltage due to the gain increment of the first and second non-inverting amplifier circuits 4 and 5 is suppressed by the differential amplifier circuit 6.

The bias resistor circuit 7 has a bias resistor 21 inserted between the positive input terminal of the first non-inverting amplifier circuit 4 and the reference potential of the reference voltage circuit 10, and a bias resistor 22 inserted between the positive input terminal of the second non-inverting amplifier circuit 5 and the reference potential of the reference voltage circuit 10. The capacitor 8 is inserted in parallel with the piezo-electric element 3 so that a composite capacity with the piezo-electric element 3 increases. By this, a lower cut-off frequency is lowered without increasing resistor values of the bias resistors 21 and 22. In control of the occupant protection device such as an airbag, since a collision decision is performed by converting a detected acceleration into velocity, it is necessary to give even a low frequency in which velocity variations can be detected more easily. For example, it is desirable to give even a frequency below 10 Hz. Also, if the bias resistors 21 and 22 are set, for example, to high resistance values of about 100 MΩ in order to lower the lower cut-off frequency, it is not possible to use these resistors under a normal atmosphere. Further, when the bias resistors 21 and 22 are set to the high resistance values as mentioned above, DC voltage may be applied to the piezo-electric element 3 by an influence of bias current, and thereby a migration may occur in the piezo-electric element 3. Because of this, it is desirable to set the bias resistors 21 and 22 to about 1 MΩ. Since the lower cut-off frequency is determined by the composite capacity of the piezo-electric element 3 and the capacitor 8 and the resistance values of the bias resistors 21 and 22, a capacity value of the capacitor 8 is set so that the bias resistors 21 and 22 are about 1 MΩ, and furthermore, so that the lower cut-off frequency is a low value, for example, below 10 Hz. Although the voltage outputs of the piezo-electric element 3 are decreased by the parallel insertion of the capacitor 8 to the piezo-electric element 3, this is supplemented by the gain increment of the first and second non-inverting amplifier circuit 4 and 5 as mentioned above. Also, since an output-temperature characteristic of the piezo-electric element 3 becomes apparent by the parallel insertion of the capacitor 8, the temperature compensation element 9 is provided in order to compensate the output-temperature characteristic of the piezo-electric element 3. The output-temperature characteristic of the piezo-electric element 3 is a positive characteristic. Therefore, the outputs of the piezo-electric element 3 becomes large when temperature rises, and becomes small when temperature drops.

The temperature compensation element 9 is inserted between the negative input terminal of the operational amplifier 11 of the first non-inverting amplifier circuit 4 and the negative input terminal of the operational amplifier 12 of the second non-inverting amplifier circuit 5. In this embodiment, the temperature compensation element 9 is posistor. The posistor 9 lowers the gains of the first and second non-inverting amplifier circuits 4 and 5 when temperature rises, and raises these gains when temperature drops. By this, the outputs of the piezo-electric element 3 are compensated against temperature variations.

The reference voltage circuit 10 has a series connection of resistors 23 and 24 inserted between the sensor power supply line 15 and the ground, and the reference voltage buffer amplifier 25 composed of a bipolar transistor type operational amplifier. The reference voltage buffer amplifier 25 receives a voltage divided by the voltage dividing resistors 23 and 24 as a positive input, and its negative input terminal is connected to an output terminal thereof. The reference voltage circuit 10 gives the reference potential to the differential amplifier circuit 6 and the bias resistor circuit 7 by way of the reference voltage buffer amplifier 25. By this, matching with the output impedances of the non-inverting amplifier circuits 4 and 5 can be attained, and thereby the common mode rejection ratio of the differential amplifier circuit 6 is increased. An operating power source of the reference voltage buffer amplifier 25 is supplied from the sensor power supply line 15. In this embodiment, since a sensor output is transmitted as current variations in the sensor power supply line 15 to the receiving circuit 2 as described below, the resistors 23 and 24 are set to high values of some KΩ so that a current flowing through the resistors 23 and 24 to the ground becomes small. In this embodiment the reference potential is given to the bias resistor circuit 7 by way of the reference voltage buffer amplifier 25, but it is also acceptable to directly give the divided voltage of the resistors 23 and 24 to the bias resistor circuit 7 without giving the output of the reference voltage buffer amplifier 25.

The sensor power supply line 15 of the acceleration sensor 1 is connected to the receiving circuit 2 of the control unit by way of a transmission cable 26, and receives a predetermined constant voltage from a unit power supply line 27 in the control unit through the receiving circuit 2. In this embodiment, from the viewpoint of noise prevention, a twisted pair cable is used as the transmission cable 26. The output terminal of the operational amplifier 16 of the differential amplifier circuit 6 which gives the sensor output of the acceleration sensor 1 is grounded through an output resistor 28, and thereby the sensor output is given as current variations in the sensor power supply line 15 to the receiving circuit 2 by way of the twisted pair cable 26. Since the operational amplifiers 11, 12, 16 and 25 operate with constant currents, the operating currents of the operational amplifiers 11, 12, 16 and 25 do not affect the sensor output given as current variations.

The receiving circuit 2 has a current mirror circuit 31 having a pair of transistor 29 and 30, and a detection resistor 32. One transistor 29 of the current mirror circuit 31 at its emitter is connected to the unit power supply line 27, at its collector is connected to the sensor power supply line 15 by way of the twisted pair cable 26, and at its base is connected to the collector and a base of the other transistor 30. An emitter of the other transistor 30 is connected to the unit power supply line 27, and its collector is grounded through the detection resistor 32. The sensor output from the acceleration sensor 1 is given as a voltage signal by the detection resistor 32.

In the circuit of FIG. 1, when the piezo-electric element 3 does not detected any acceleration, the differential amplifier circuit 6 gives a prescribed voltage output based on the reference potential of the reference voltage circuit 10, and thereby a prescribed current flows through the output resistor 28 to the ground. Accordingly, a certain current corresponding to the prescribed current which flows through the output resistor 28 is given from the acceleration sensor 1 to the sensor power supply line 15, the twisted pair cable 26 and the unit power supply line 27. In the receiving circuit 2, the pair of transistors 29 and 30 give a current to the detection resistor 32 based on base-emitter voltages according to the certain current flowing through the unit power supply line 27. Thus, a prescribed voltage indicating that no acceleration is detected is given from the detection resistor 32.

When the piezo-electric element 3 detects an acceleration, the voltage outputs from the both ends of the piezo-electric element 3 are non-inversion amplified respectively by the first and second non-inverting amplifier circuits 4 and 5, and then the non-inversion amplified outputs are differentially amplified by the differential amplifier circuit 6. By this, the differential amplifier circuit 6 gives a voltage output which varies according to the acceleration, and, by means of the output resistor 28, this voltage output is given as current variations in the sensor power supply line 15 from the acceleration sensor 1 to the receiving circuit 2 in the control unit. In the receiving circuit 2, the base-emitter voltage of one transistor 29 of the current mirror circuit 31 varies according to the current variations in the unit power supply line 27, that is, the sensor output of the acceleration sensor 1. By this, a collector current flows through the detection resistor 32 so that the base-emitter voltage of the other transistor 30 is the same potential as the base-emitter voltage of one transistor 29. Because of this, the sensor output of the acceleration sensor 1 is given as the voltage signal by the detection resistor 32, and this voltage signal is output to the rearward-stage circuit of the control unit. If the detection resistor 32 is set to the same resistance value as that of the output resistor 28 of the acceleration sensor 1, a voltage nearly the same as a voltage at both ends of the output resistor 28 is given from the detection resistor 32.

According to a composition like this, the output fluctuations of the piezo-electric element 3 due to variations in ambient temperature are compensated by the gain adjustments of the first and second non-inverting amplifier circuits 4 and 5 by means of the temperature compensation element 9. Accordingly, even when the acceleration sensor 1 is provided in a place with extreme ambient temperature variations such that it directly receives heat from the vehicle engine, the sensor output of the acceleration sensor 1 does not fluctuate by variations in ambient temperature.

Also, by inserting the capacitor 8 in parallel with the piezo-electric element 3, the composite capacity is increased. By this, the lower cut-off frequency can be lowered without increasing the resistance values of the bias resistors 21 and 22. Because of this, the acceleration sensor 1 can give a lower frequency component, and thereby the sensor output that facilitates a collision decision can be given. Also, it is not necessary to set the bias resistors 21 and 22 to such high resistance values that cannot be used in an ordinary atmosphere. Further, the migration in the piezo-electric element 3, occurring by setting the bias resistors 21 and 22 to high resistance values, can be prevented.

Also, the sensor output of the acceleration sensor 1 is transmitted to the receiving circuit 2 in the control unit as current variations in the power supply lines. Because of this, it is not necessary to provide a signal line. Also, since it is not necessary to use a ground potential by car body grounding as a reference, noise prevention can be done more effectively.

Further, the receiving circuit 2 is formed with the current mirror circuit 31 comprising the transistors 29 and 30. Because of this, since temperature characteristics of the base-emitter voltages of the transistors 29 and 30 are cancelled, no temperature compensation means is required. Also, since the receiving circuit 2 operates with a voltage value supplied to the acceleration sensor 1, there is no need to prepare another operating voltage value. Accordingly, a composition of the receiving circuit 2 can be simplified in the extreme.

Figure 2:
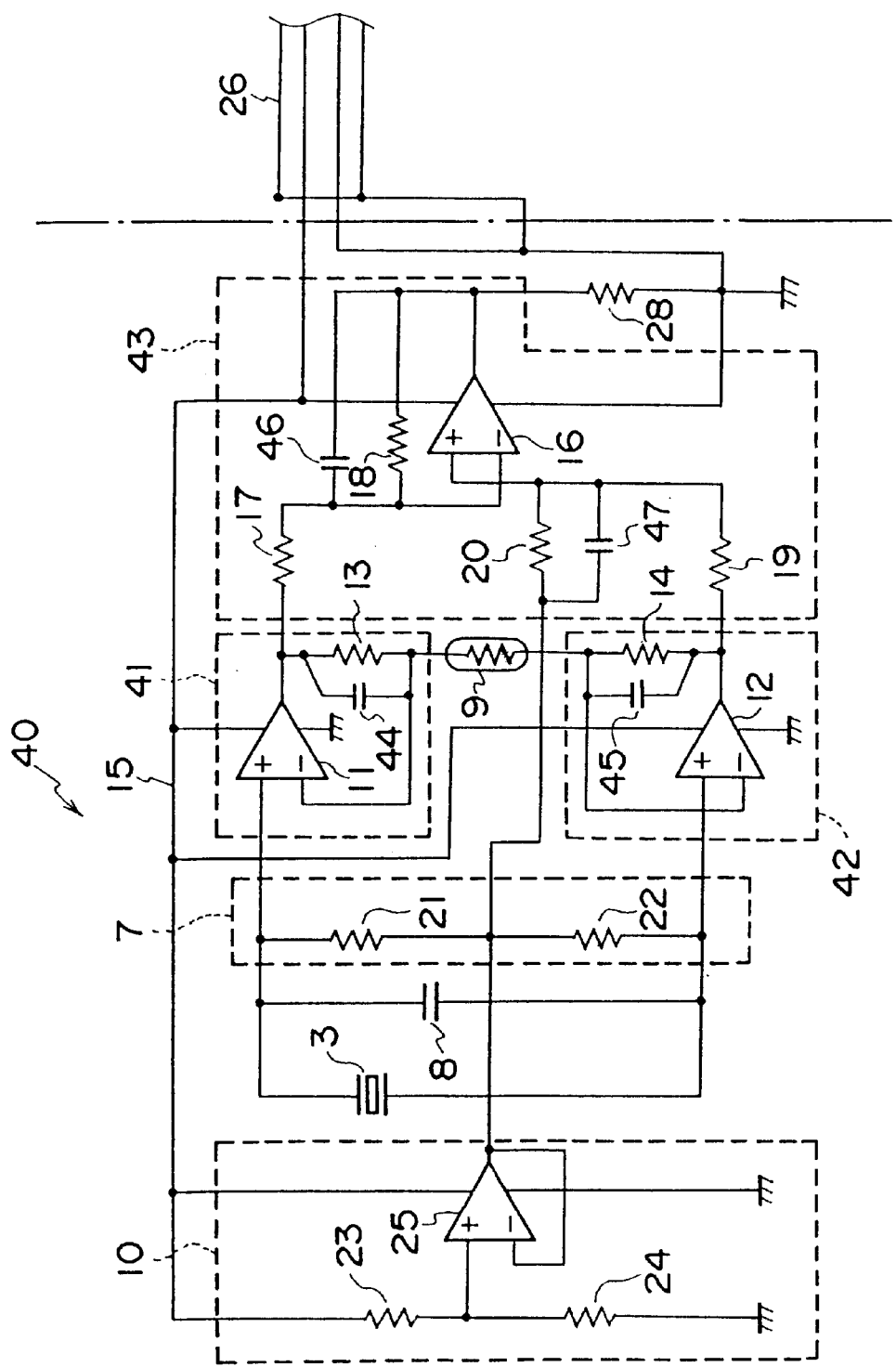
FIG. 2 is a circuit diagram showing a second example of an acceleration sensor in FIG. 1.

FIG. 2 is a circuit diagram showing a second example of an acceleration sensor in FIG. 1. In FIG. 2, a reference numeral 40 is an acceleration sensor, and components that are given the same reference numerals as those of FIG. 1 indicate the same.

In this example, an amplifier circuit inputting the voltage outputs at the both ends of the piezo-electric element 3 has first and second non-inverting amplifier circuits 41 and 42 each having an integrating function, and a differential amplifier circuit 43 having an integrating function. By this, the acceleration sensor 40 outputs an integrated value of an acceleration as a sensor output. The first and second non-inverting amplifier circuits 41 and 42 have capacitors 44 and 45 each inserted in parallel with the resistors 13 and 14, in addition to the composition of the first and second non-inverting amplifier circuits 4 and 5 of FIG. 1. The differential amplifier circuit 43 has capacitors 46 and 47 each inserted in parallel with the resistors 18 and 20, in addition to the composition of the differential amplifier circuit 6 of FIG. 1. Composition and operation of other potions in this example are as described in the embodiment of FIG. 1.

According to a composition like this, since the integrated value of an acceleration is given from the acceleration sensor 40 as the sensor output, the control unit having the receiving circuit 2 does not need to execute an integration processing of the sensor output. Because of this, a composition of the control unit can be simplified, and a processing speed of control can be risen.

Although in the composition of FIG. 2 the first and second non-inverting amplifier circuits 41 and 42 and the differential amplifier circuit 43 each have the integrating function, either the first and second non-inverting amplifier circuits 41 and 42 or the differential amplifier circuit 43 may have the integrating function.

Figure 3:
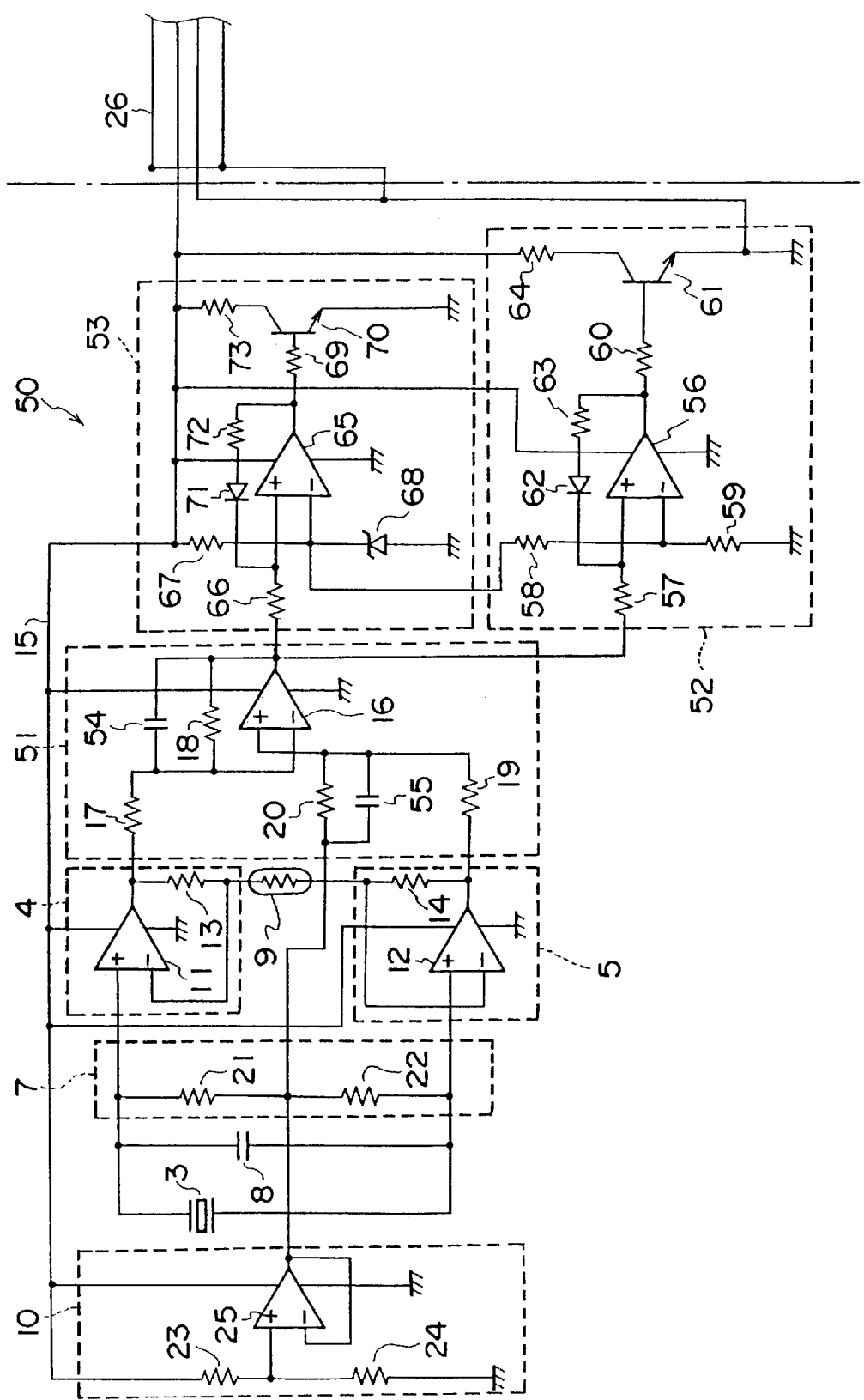
FIG. 3 is a circuit diagram showing a third example of an acceleration sensor in FIG. 1.

FIG. 3 is a circuit diagram showing a third example of an acceleration sensor in FIG. 1. In FIG. 3, a reference numeral 50 is an acceleration sensor, and components that are given the same reference numerals as those of FIG. 1 indicate the same.

This example has an amplifier circuit including a differential amplifier circuit 51 having an integrating function, a first comparison circuit 52 giving a first comparison output based on a comparison between an output of the differential amplifier circuit 51 and a first threshold value, and a second comparison circuit 53 giving a second comparison output based on a comparison between the output of the differential amplifier circuit 51 and a second threshold value higher than the first threshold value. By this, the acceleration sensor 50 gives the first and second comparison outputs as the sensor output.

The differential amplifier circuit 51 has capacitors 54 and 55 each inserted in parallel with the resistors 18 and 20, in addition to the composition of the differential amplifier circuit 6 of FIG. 1. The differential amplifier circuit 51 differentially amplifies and integrates the outputs of the first and second non-inverting amplifier circuits 4 and 5, and outputs the integrated value of an acceleration.

The first comparison circuit 52 has a first comparator 56 of which an operating power source is supplied from the sensor power supply line 15. A positive input terminal of the first comparator 56 inputs the output of the differential amplifier circuit 51 through a resistor 57, and its negative input terminal inputs the first threshold value which is given by a divided voltage by means of reference resistors 58 and 59 connected in series. The series connection of the reference resistors 58 and 59 is connected in parallel to a Zener diode 68 which gives the second threshold value in the second comparison circuit 52, and gives the first threshold value by dividing a constant voltage which gives the second threshold value. The first threshold value is set to a value higher than an output voltage of the differential amplifier circuit 51 under the state that the piezo-electric element 3 does not detect an acceleration. An output terminal of the first comparator 56 is connected to a base of a first switching transistor 61 through a resistor 60, and is also connected to its positive input terminal through a series connection of a resistor 63 and a first diode 62 which is inserted so that the direction from the output terminal to the positive input terminal becomes the forward direction. The first diode 62 and the resistors 57 and 63 constitute a chattering prevention circuit. That is, when the output of the differential amplifier circuit 51 exceeds the first threshold value, a High level output is provided as feedback to the positive input terminal of the first comparator 56. By this, chattering of the first comparator 56 is prevented. An emitter of the first switching transistor 61 is grounded, and its collector is connected to the sensor power supply line 15 through a resistor 64.

In the first comparison circuit 52 having a composition like this, when the output of the differential amplifier circuit 51 is below the first threshold value, the output of the first comparator 56 is a Low level, and the first switching transistor 61 is in an Off state. When the output of the differential amplifier circuit 51 becomes above the first threshold value, the output of the first comparator 56 becomes a High level, and the first switching transistor 61 is in an On state.

The second comparison circuit 53 has a second comparator 65 of which an operating power source is supplied from the sensor power supply line 15. A positive input terminal of the second comparator 65 inputs the output of the differential amplifier circuit 51 through a resistor 66, and its negative input terminal inputs the second threshold value which is given by a series connection of a resistor 67 and the Zener diode 68 inserted between the sensor power supply line 15 and the ground. The second threshold value, as described above, has a value higher than the first threshold value. An output terminal of the second comparator 65 is connected to a base of a second switching transistor 70 through a resistor 69, and is also connected to its positive input terminal through a series connection of a second diode 71 and a resistor 72. As explained in the first comparison circuit 52, the second diode 71 and the resistors 66 and 72 constitute a chattering prevention circuit. An emitter of the second switching transistor 70 is grounded, and its collector is connected to the sensor power supply line 15 through a resistor 73.

In the second comparison circuit 53 having a composition like this, when the output of the differential amplifier circuit 51 is below the second threshold value, the output of the second comparator 65 is a Low level, and the second switching transistor 70 is in an Off state. When the output of the differential amplifier circuit 51 becomes above the second threshold value, the output of the second comparator 65 becomes a High level, and the second switching transistor 70 is in an On state. Composition of other potions in this example is as described in FIG. 1.

Figure 4:
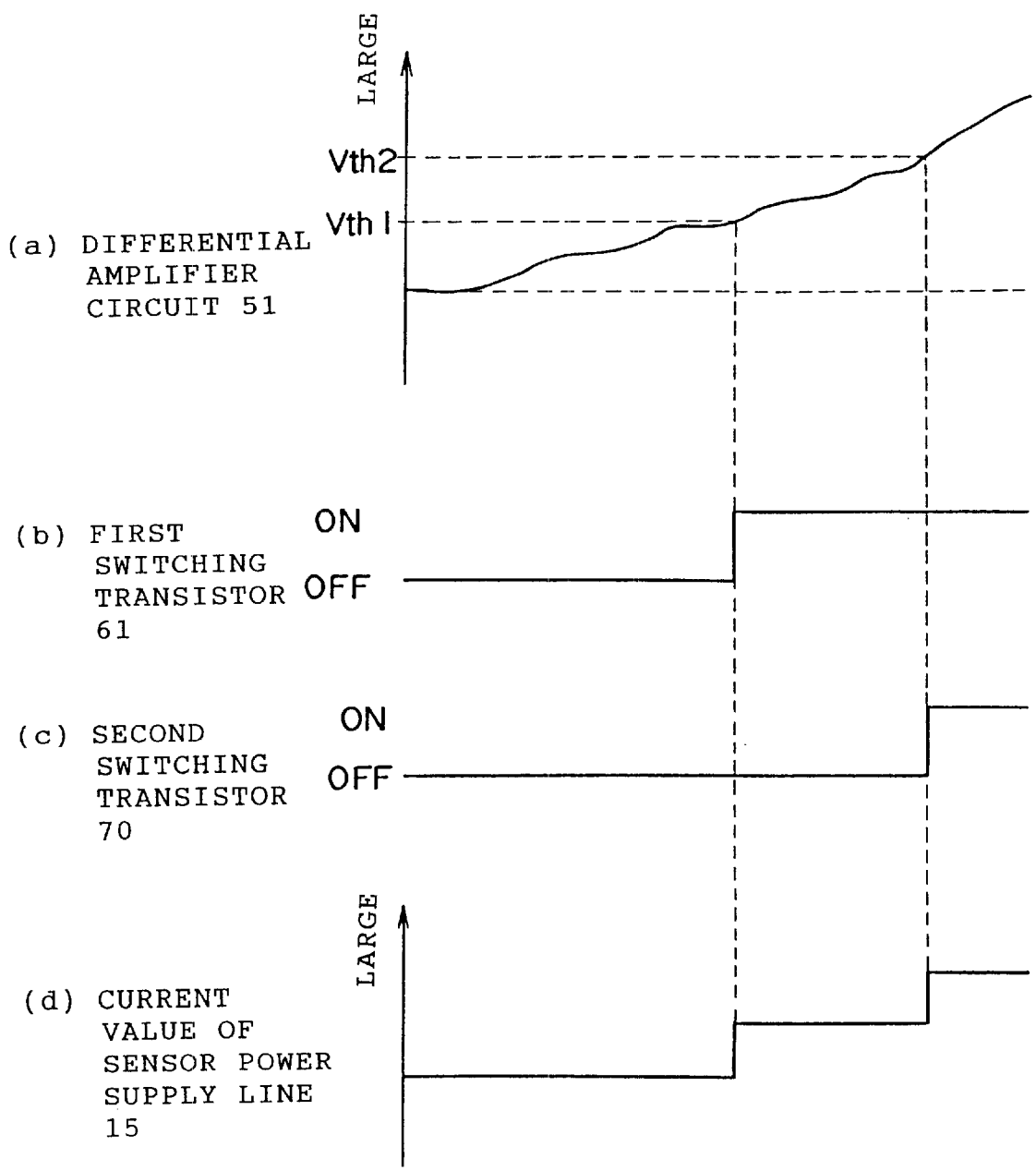
FIG. 4 is an explanatory drawing for explaining an operation of the acceleration sensor of FIG. 3.

FIG. 4 is an explanatory drawing for explaining an operation of the acceleration sensor 50 of FIG. 3. In FIG. 4, a reference letter (a) shows the output of the differential amplifier circuit 51, a reference letter (b) shows On/Off of the first switching transistor 61, a reference letter (c) shows On/Off of the second switching transistor 70, and a reference letter (d) shows a current value in the sensor power supply line 15.

When the piezo-electric element 3 does not detect any acceleration, because the differential amplifier circuit 51 gives the prescribed voltage output based on the reference potential from the reference voltage circuit 10, both of the first and second switching transistors 61 and 70 in the first and second comparison circuits 52 and 53 are in the Off state. Therefore, the current value in the sensor power supply line 15 does not vary.

On the other hand, when the piezo-electric element 3 detects an acceleration, the differential amplifier circuit 51 gives the voltage output (a) representative of an integrated value of the acceleration. When the output (a) of the differential amplifier circuit 51 exceeds the first threshold value Vth1, the first switching transistor 61 is turned On. Hereby, a current flows through the resistor 64 and the first switching transistor 61 from the sensor power supply line 15, and the current value in the sensor power supply line 15 rises as shown in FIG. 4(d). That is, the first comparison output is given. When the output of the differential amplifier circuit 51 further rises to exceed the second threshold value Vth2, the second switching transistor 70 is turned On. Hereby, a current flows through the resistor 73 and the second switching transistor 70 from the sensor power supply line 15, the current value in the sensor power supply line 15 further rises as shown in FIG. 4(d). That is, the second comparison output is given. The first and second comparison outputs are received by the receiving circuit 2 as described in FIG. 1. Other operation is as described in FIG. 1.

In the composition of FIG. 3, although the first and second comparison outputs are given, it is not intended to be limited thereto. The number of comparison circuits can be one or more than two, and thereby it is possible to give one comparison output or more than two comparison outputs. Also, in the composition of FIG. 3, the differential amplifier circuit 51 alone has the integrating function, but it is not intended to be limited thereto. As described in FIG. 2, the first and second non-inverting amplifier circuits 4 and 5 can have an integrating function together with the differential amplifier circuit 51, or only the first and second non-inverting amplifier circuits 4 and 5 can have the integrating function.

According to a composition like this, since it is possible to directly give collision signals by the comparison outputs, a composition of the control unit which controls the occupant protection device such as an airbag can be further simplified. Also, according to the composition of FIG. 3, a time interval between the first comparison output and the second comparison output becomes small under a high-speed collision, and becomes large under a low-speed collision. Because of this, based on a difference in the time interval, it is possible to control the occupant protection device more exactly.

Figure 5:
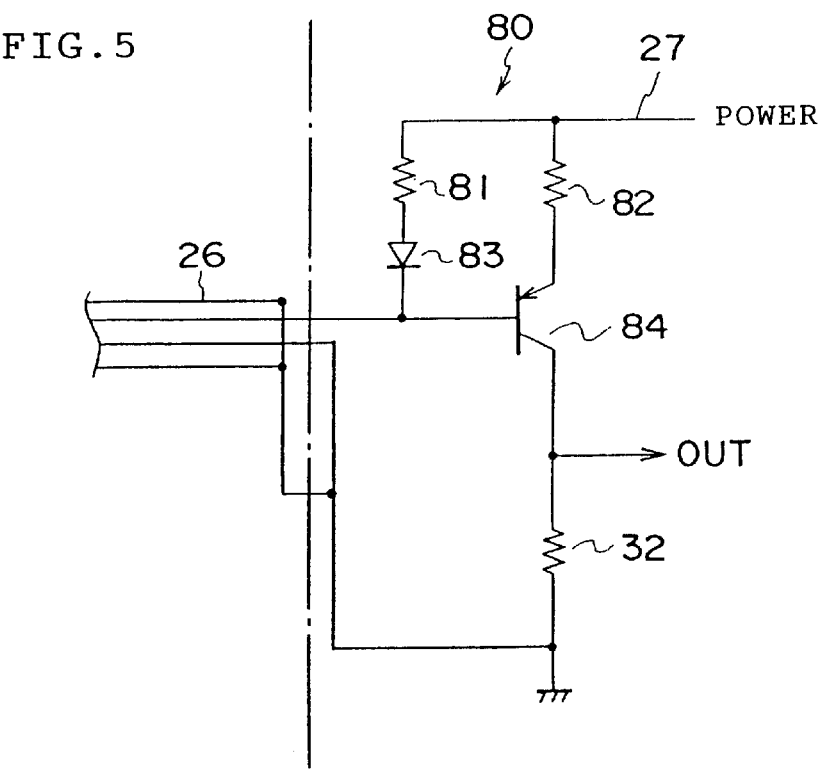
FIG. 5 is a circuit diagram showing a second example of a receiving circuit in FIG. 1.

FIG. 5 is a circuit diagram showing a second example of a receiving circuit in FIG. 1. In FIG. 5, components that are given the same reference numerals as those of FIG. 1 indicate the same.

A receiving circuit 80 has a first resistor 81, a second resistor 82, a diode 83, a transistor 84 and the detection resistor 32. A base of the transistor 84 is connected to the unit power supply line 27 through a series connection of the first resistor 81 and the diode 83, and is also connected to the twisted pair cable 26. The diode 83 is a temperature compensation diode for the transistor 84, and cancels a temperature characteristic of base-emitter voltage of the transistor 84. The twisted pair cable 26, as described above, is connected to the sensor power supply line 15 of the acceleration sensor 1. An emitter of the transistor 84 is connected through the second resistor 82 to the unit power supply line 27, and its collector is grounded through the detection resistor 32. The sensor output from the acceleration sensor 1 is given as a voltage signal by the detection resistor 32.

In a composition like this, if a current flowing through the first resistor 81 varies by the sensor output from the acceleration sensor 1, a current flows through the detection resistor 32 via the second resistor 82 and the transistor 84 in accordance with variations in the current flowing through the first resistor 81. By this, the sensor output from the acceleration sensor 1 is output as the voltage signal by means of the detection resistor 32. According to this example, there is no need to use a plurality of transistors.

Figure 6:
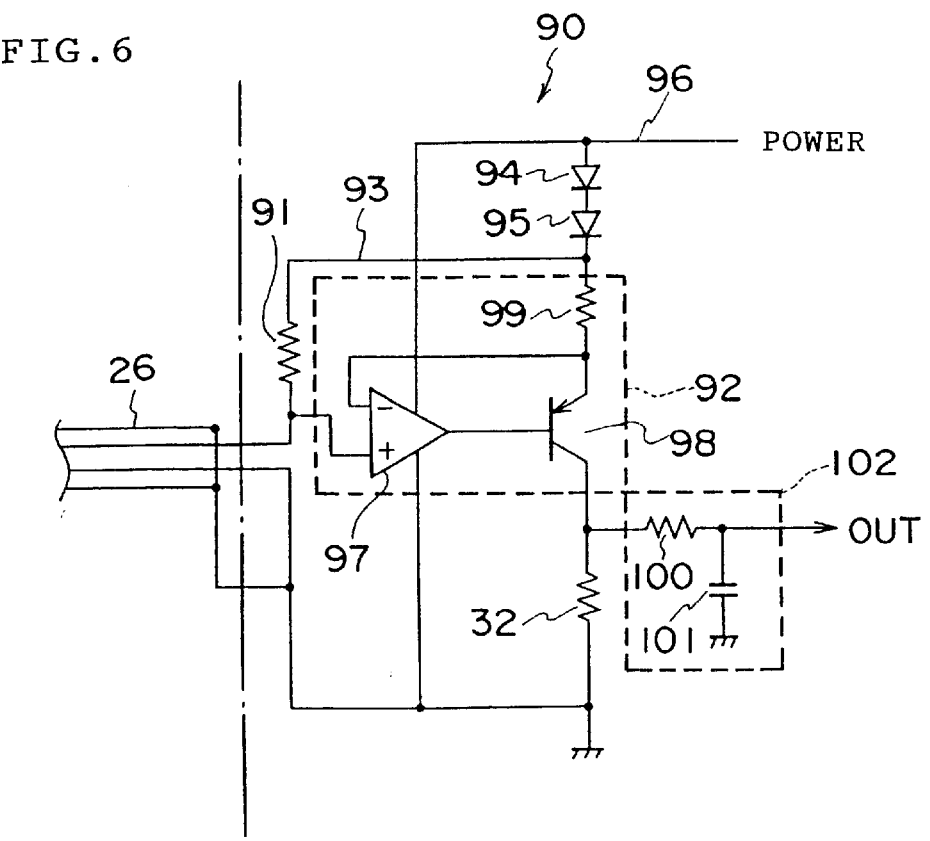
FIG. 6 is a circuit diagram showing a third example of a receiving circuit in FIG. 1.

FIG. 6 is a circuit diagram showing a third example of a receiving circuit in FIG. 1. In FIG. 6, components that are given the same reference numerals as those of FIG. 1 indicate the same.

A receiving circuit 90 includes a first resistor 91 and a constant-current circuit 92. The first resistor 91 at one end is connected to a first unit power supply line 93, and at the other end is connected to the twisted pair cable 26. The twisted pair cable 26, as described above, is connected to the sensor power supply line 15 of the acceleration sensor 1. The first unit power supply line 93 is connected to a second unit power supply line 96 through a series connection of diodes 94 and 95. Hereby, a constant voltage lower than a voltage in the second unit power supply line 96 is supplied to the first unit power supply line 93 by forward voltage drops of the diodes 94 and 95.

The constant-current circuit 92 has an operational amplifier 97, a transistor 98 and a second resistor 99. An operating power source of the operational amplifier 97 is supplied from the second unit power supply line 96. A positive input terminal of the operational amplifier 97 is connected to the other end of the first resistor 91, its negative input terminal is connected to an emitter of the transistor 98, and its output terminal is connected to a base of the transistor 98. The emitter of the transistor 98 is connected through the second resistor 99 to the first unit power supply line 93 in addition to the connection with the negative input terminal of the operational amplifier 97, and its collector is grounded through the detection resistor 32. The sensor output from the acceleration sensor 1 is detected as a voltage signal by the detection resistor 32, and is output through an integration filter 102 for eliminating noise. The integration filter 102 comprises a resistor 100 and a capacitor 101.

Although the receiving circuits shown in FIG. 1 and FIG. 2 do not have the integration filter 102, it is possible to provide the integration filter as this example.

In a composition like this, if a current flowing through the first resistor 91 varies by the sensor output from the acceleration sensor 1, a current flows through the second resistor 99 so that a voltage at both ends of the second resistor 99 becomes equal to a voltage at both ends of the first resistor 91. The current flowing through the second resistor 99 is given to the detection resistor through the transistor 98. By this, the sensor output from the acceleration sensor 1 is detected as the voltage signal by the detection resistor 32, and is output to the rearward-stage circuit of the control unit through the integration filter 102. According to this example, it is possible to improve received precision of the sensor output from the acceleration sensor 1.

Figure 7:
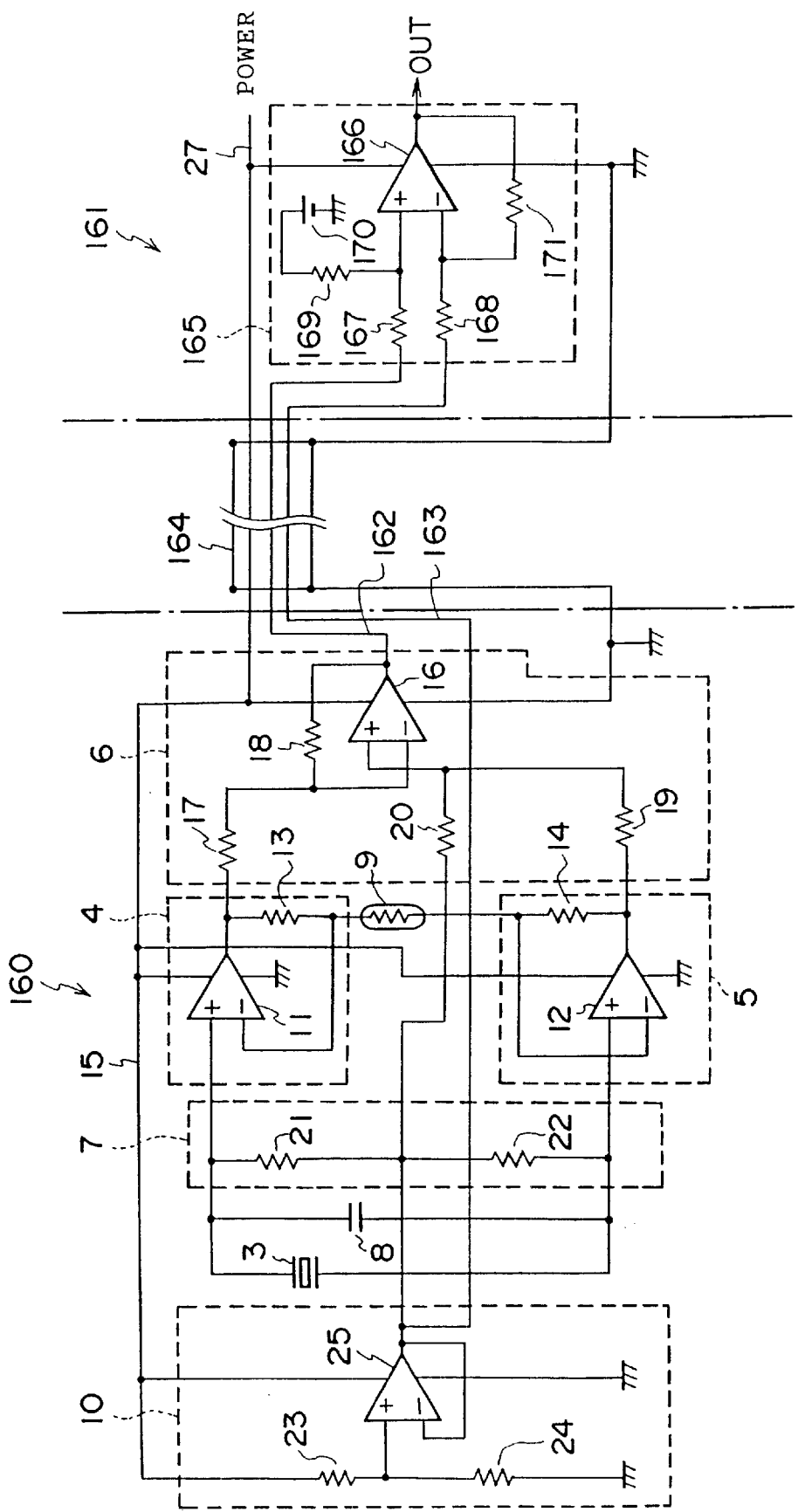
FIG. 7 is a circuit diagram showing another embodiment of an acceleration sensor and an acceleration detecting system according to the present invention.

FIG. 7 is another embodiment of an acceleration sensor and an acceleration detecting system according to the present invention. In FIG. 7, components that are given the same reference numerals as those of FIG. 1 indicate the same. In this embodiment, a sensor output of an acceleration sensor 160 is transmitted to a receiving circuit 161 as a voltage signal.

The acceleration sensor 160 has a sensor output signal line 162 giving the voltage output of the differential amplifier circuit 6, and a reference voltage signal line 163 giving the reference potential of the reference voltage circuit 10, in addition to the sensor power supply line 15. These lines 15, 162 and 163 are connected to a control unit having the receiving circuit 161 by way of a twisted pair cable 164. The sensor power supply line 15 is connected to the unit power supply line 27 in the control unit, and a predetermined constant voltage is supplied from the unit power supply line 27 to the sensor power supply line 15. The sensor output signal line 162 and the reference voltage signal line 163 are connected to the receiving circuit 161. By this, the receiving circuit 161 is designed to receive the voltage output of the differential amplifier circuit 6 and the reference potential of the reference voltage circuit 10. The voltage output given from the differential amplifier circuit 6 of the acceleration sensor 160, when the piezo-electric element 3 detects an acceleration, is given as a superposed signal of the reference potential of the reference voltage circuit 10 and the detected acceleration. Because of this, as described below, the receiving circuit 161 receives the sensor output from the acceleration sensor 160 by differentially amplifying the voltage output of the differential amplifier circuit 6 and the reference potential of the reference voltage circuit 10.

The receiving circuit 161 is composed of a differential amplifier circuit 165. The differential amplifier circuit 165 includes an operational amplifier 166 of which an operating power source is supplied from the unit power supply line 27. A positive input terminal of the operational amplifier 166 inputs the voltage output of the differential amplifier circuit 6 of the acceleration sensor 160 through a resistor 167, and its negative input terminal inputs the reference potential of the reference voltage circuit 10 of the acceleration sensor 160 through a resistor 168. Furthermore, the positive input terminal of the operational amplifier 166 is connected through a resistor 169 to an operating reference potential 170, and hereby is pulled up by the operating reference potential 170. Also, the negative input terminal of the operational amplifier 166 is connected through a resistor 171 to its output terminal.

The receiving circuit 161 having a composition like this differentially amplifies the voltage output of the differential amplifier circuit 6 and the reference potential of the reference voltage circuit 10 of the acceleration sensor 160, and gives the sensor output on the basis of the operating reference potential 170. That is, if the piezo-electric element 3 of the acceleration sensor 160 does not detect any acceleration, since the voltage output of the differential amplifier circuit 6 of the acceleration sensor 160 is the prescribed voltage, the receiving circuit 161 gives a prescribed voltage output based on the operating reference potential 170. If the piezo-electric element 3 of the acceleration sensor 160 detects an acceleration, the receiving circuit 161 gives the sensor output which varies on the basis of a prescribed potential based on the operating reference potential 170. Other composition and operation are as described in FIG. 1.

According to a composition like this, even when the voltage of the sensor power supply line 15 fluctuates for some reason or other, since the voltage output of the differential amplifier circuit 6 and the reference potential of the reference voltage circuit 10 of the acceleration sensor 160 fluctuate together with the voltage of the sensor power supply line 15, the voltage fluctuation in the sensor power supply line 15 is cancelled by the differential amplifier circuit 165 of the receiving circuit 161. Because of this, the output of the receiving circuit 161 is not affected by power fluctuation. There is a possibility that the voltage fluctuation of the sensor power supply line 15 will occur, for example, by lengthening the twisted pair cable 164 which connects the acceleration sensor 160 and the receiving circuit 161. When the transmission cable 164 between the acceleration sensor 160 and the receiving circuit 161 is affected by a noise, its in-phase component is cancelled by the differential amplifier circuit 165. In particular, when the twisted pair cable is used as the transmission cable 164 as described in this embodiment, since an influence of the noise to the sensor output signal line 162 and the reference voltage signal line 163 occurs alike, the noise almost becomes in-phase. Because of this, the noise is cancelled by the differential amplifier circuit 165 namely the receiving circuit 161.

Furthermore, according to this embodiment, the receiving circuit 161 gives the sensor output which varies on the basis of the prescribed potential based on the operating reference potential 170. Hereby, since the sensor output in a region of positive voltage is given, an analog-to-digital conversion of the sensor output becomes easy. The operating reference potential 170 can be set to an optional potential. For example, if the operating reference potential 170 is set to a lower potential, it is possible to extend a dynamic range of a retardation side.

Although in this embodiment the acceleration sensor 160 does not have an integrating function, it is possible to provide the acceleration sensor 160 with the integrating function as described in the example of FIG. 2.

This embodiment can be applied also to the composition of FIG. 3. In this case, in order to give the control unit the first and second comparison outputs as voltage signals, the output signals of the first and second comparators 56 and 65 are given to the control unit through the twisted pair cable, respectively.

Figure 8:
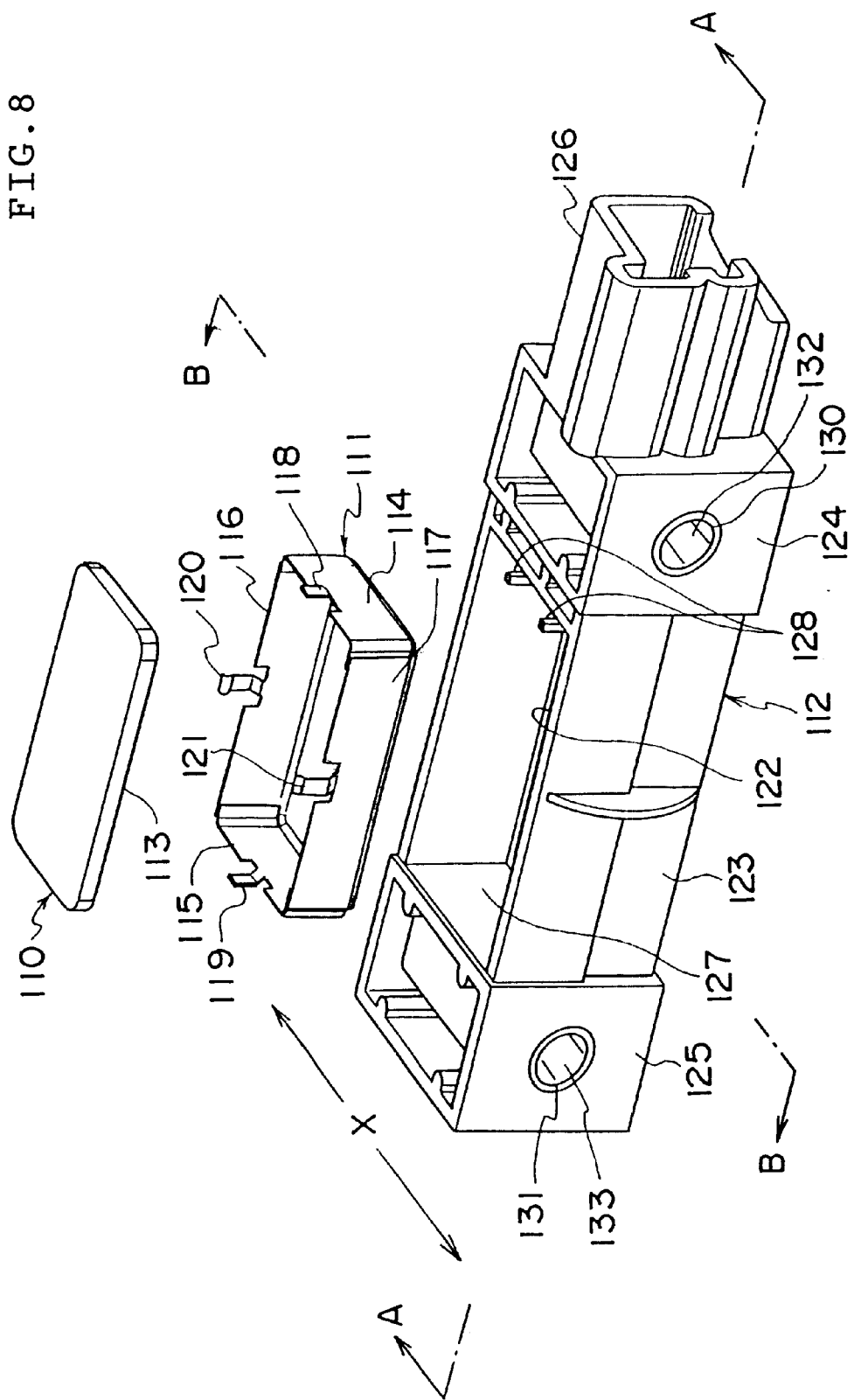
FIG. 8 is a perspective view showing a first example of an assembly composition of an acceleration sensor according to the present invention.
Figure 9:
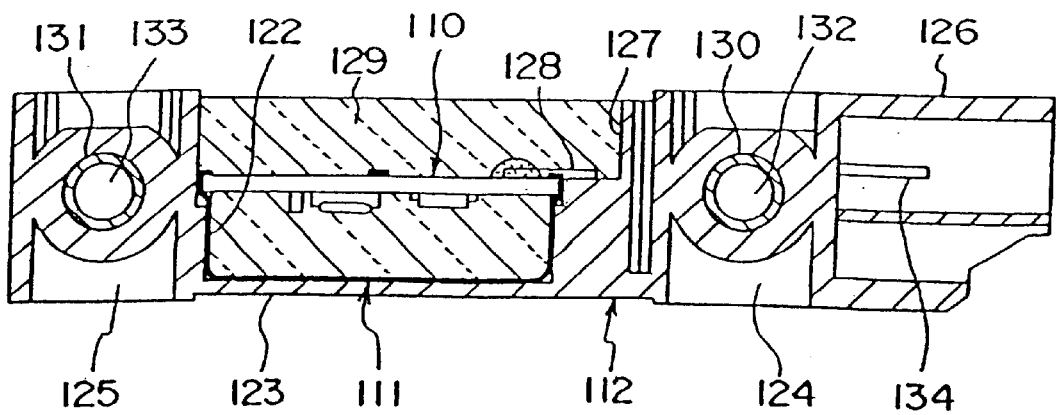
FIG. 9 is the A—A sectional view of FIG. 8.
Figure 10:
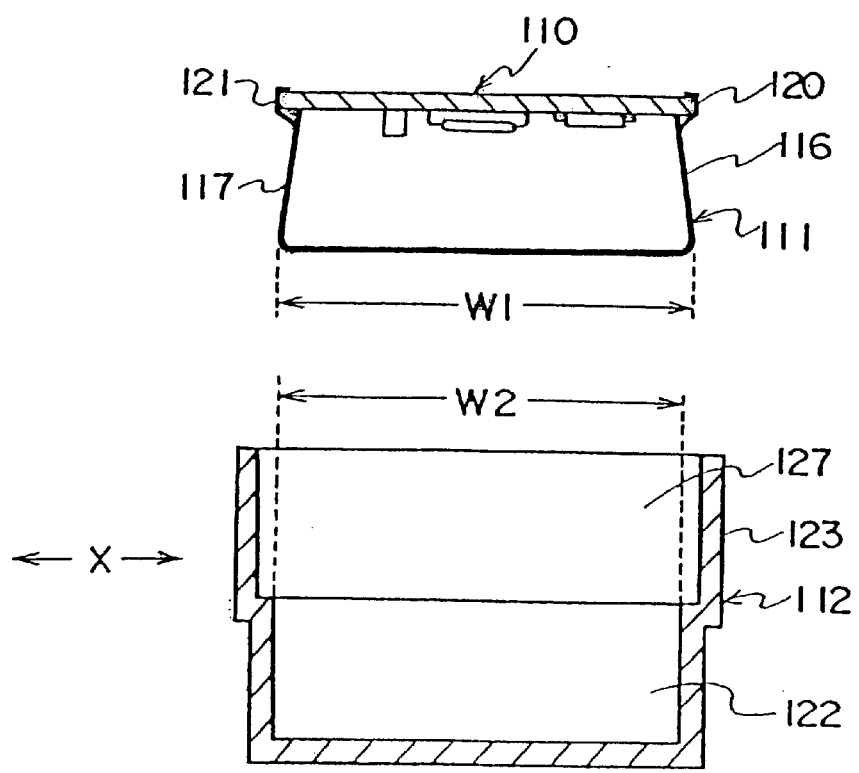
FIG. 10 is the B—B sectional view of FIG. 8.

FIG. 8 is a perspective view showing an example of an assembly composition of the acceleration sensor of FIG. 1, FIG. 2, FIG. 3 and FIG. 7, FIG. 9 is the A—A sectional view of FIG. 8, and FIG. 10 is the B—B sectional view of FIG. 8.

In FIG. 8, FIG. 9 and FIG. 10, a reference numeral 110 is a circuit base board, a reference numeral 111 is a metallic shielding case, and a reference numeral 112 is a plastic housing. The acceleration sensor 1 of FIG. 1, the acceleration sensor 40 of FIG. 2, the acceleration sensor 50 of FIG. 3 or the acceleration sensor 160 of FIG. 7 is mounted on the circuit base board 110.

The circuit of the acceleration sensor is mounted on a lower face 113 side of the circuit base board 110 so that directions indicated by arrows X becomes acceleration detecting directions. The shielding case 111 is a case which is formed by an elastic metal such as brass, and its upper face is opened. Both ends of side walls 114 and 115 of the case 111 each have a bent portion which is bent inwards, and these bent portions overlap with both ends of side walls 116 and 117 without being fixed each other, respectively. The shielding case 111, furthermore, has fixing clicks 118, 119, 120 and 121 at a middle portion of an upper end of each side wall 114–117. The circuit base board 110 is designed to be fixed to the upper face of the shielding case 111 by the fixing clicks 118–121 so that the lower face 113 having the acceleration sensor circuit becomes inside the shielding case 111.

The housing 112, which is formed by PBT (Polybutylen Terephthalate) mixed with glass fiber in this example, has a container portion 123 having a container chamber 122, fixing portions 124 and 125 formed at both ends of the container portion 123, and a connector portion 126 formed at one fixing portion 124. The container chamber 122 of the container portion 123, as shown in FIG. 9 and FIG. 10, is formed below a resin filled chamber 127. The shielding case 111 to which the circuit base board 110 is fixed is housed in the container camber 122, and terminals 128 in the container potion 123 are connected to the circuit base board 110. Thereafter, the resin filled chamber 127, the container chamber 122 and the shielding case 111 are filled up with resin 129 such as epoxy resin. By this, the shielding case 111 is fixed and is also waterproofed.

The fixing portions 124 and 125 have fixing holes 132 and 133 reinforced by metal tubes 130 and 131, and the housing 112 is designed to be fixed, for example, at a radiator mount maintaining a radiator, by bolts or the like concerned with the fixing holes 132 and 133 so that the acceleration sensor matches with the acceleration detecting directions X. The connector portion 126 has connector terminals 134 connected to the terminals 128 of the container portion 123. The acceleration sensor is connected to the control unit having the receiving circuit 2, 80, 90 or 161, which is provided in a vehicle room, by way of a connection of the connector terminals 134 and the twisted pair cable 26 or 164.

Furthermore, as shown in FIG. 10, the shielding case 111 is formed so that a width W1 in the acceleration detecting directions X is a little larger than a width W2 of the container chamber 122 of the housing 112. In this example, a sectional shape of the shielding case 111 in the acceleration detecting directions X is formed into a trapezoid shape, and hereby a width of its bottom portion is composed to have the width W1. By this, when the shielding case 111 is housed in the container chamber 122 of the housing 112, at least lower portions of the side walls 116 and 117 of the shielding case 111 meeting at right angle to the acceleration detecting directions X are designed to pressure-contact with the container chamber 122.

According to a composition like this, since the side walls 116 and 117 of the shielding case 111 meeting at right angle to the acceleration detecting directions X are in the pressure-contact with the container chamber 122 of the housing 112, an acceleration is directly transmitted from the housing 112 to the shielding case 111. Because of this, dispersion in a sensor performance due to dispersion in a gap between the shielding case 111 and the container camber 122 can be prevented. Also, since the circuit base board 110 is fixed by the fixing clicks 118–121 provided to the shielding case 111, there is no need to use other parts such as screws, and it is possible to reduce the number of parts. Furthermore, since the circuit base board 110 is fixed to the shielding case 111 by the fixing clicks 118–121, and, since the shielding case 111 is pressure-fitted into the container chamber 122 of the housing 112, positional slippage of the circuit base board 110 can be prevented when the resin filled chamber 127, the container camber 122 and the shielding case 111 are filled up with the resin.

Figure 11:
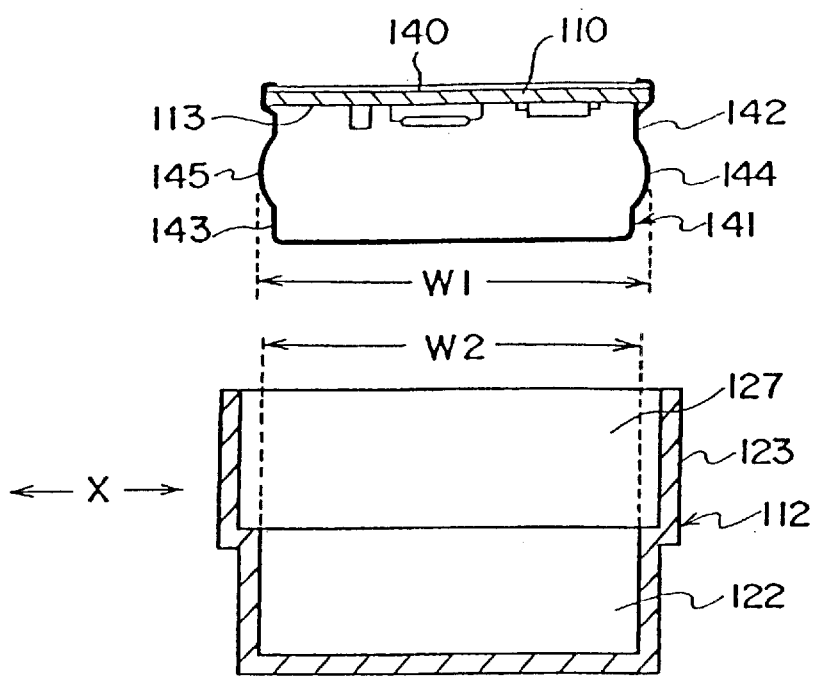
FIG. 11 is a sectional view showing a second example of an assembly composition of an acceleration sensor according to the present invention.

FIG. 11 is a sectional view showing a second example of an assembly composition of the acceleration sensor. In FIG. 11, components that are given the same reference numerals as those of FIG. 8, FIG. 9 and FIG. 10 indicate the same.

In this example, a metallic layer 140 such as copper foil for shielding is formed to an upper face opposite to the lower face 113 having the acceleration sensor circuit, and convex portions 144 and 145 projecting outwards are also formed at side walls 142 and 143 of a shielding case 141 meeting at right angle to the acceleration detecting directions X. By the convex portions 144 and 145, a width W1 of the shielding case 141 in the acceleration detecting directions X is designed to become a little lager than the width W2 of the container chamber 122 of the housing 112. Hereby, at least the convex portions 144 and 145 of the side walls 142 and 143 of the shielding case 141 meeting at right angle to the acceleration detecting directions X are designed to pressure-contact with the container chamber 122 of the housing 112. Other composition including other composition of the shielding case 141 is as described in FIG. 8, FIG. 9 and FIG. 10.

According to this example, since the metallic layer 140 for shielding is formed on the upper face of the circuit base board 110, electromagnetic interference can be prevented more effectively. Incidentally, the metallic layer 140 for shielding can also be applied to the example of FIG. 8.

Figure 12:
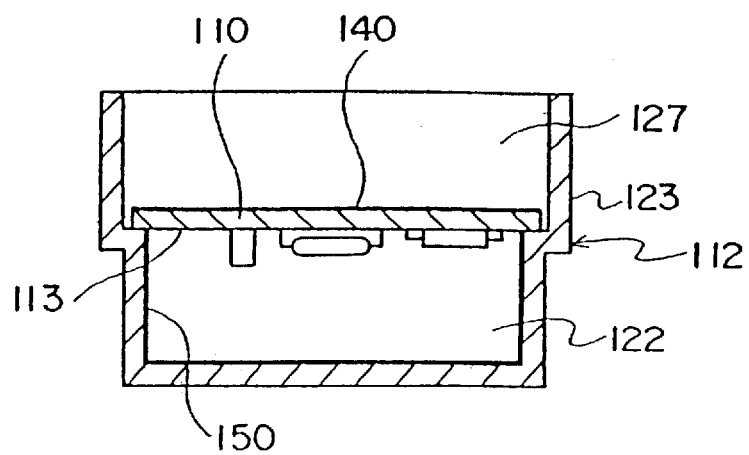
FIG. 12 is a sectional view showing a third example of an assembly composition of an acceleration sensor according to the present invention.

FIG. 12 is a sectional view showing a third example of an assembly composition of the acceleration sensor according to the present invention. In FIG. 12, components that are given the same reference numerals as those of FIG. 8, FIG. 9, FIG. 10 and FIG. 11 indicate the same.

In this example, instead of the shielding case, a metallic layer 150 for shielding is formed on an inside face of the container chamber 122 of the housing 112. The inside face of the container chamber 122 is covered with the metallic layer 150. The circuit base board 110 is fixed to an upper face of the container chamber 122 so that the lower face 113 having the acceleration sensor circuit becomes inside the container chamber 122. The metallic layer 150 is formed by plating, for example. As described in the example of FIG. 8, the resin filled chamber 127 and the container chamber 122 are filled up with the resin. Although the metallic layer 150 can also be formed on an outside face of the housing 112 so as to cover the container chamber 122, since the metallic layer is apt to peel off with an external damage, it is desirable to form inside the container chamber 122. On the upper face of the circuit base board 110, the metallic layer 140 for shielding is formed as described in FIG. 10. According to this example, since there is no need of using the metallic shielding case, it is possible to reduce the number of parts and weight of the acceleration sensor.

INDUSTRIAL APPLICABILITY

The acceleration sensor and the acceleration detection system according to the present invention can be applied effectively to a control unit controlling an occupant protection device such as an airbag and a sheet-belt tensioner.

What is claimed is:

1. An acceleration sensor comprising:
   a piezo-electric element for detecting an acceleration;
   an amplifier circuit for inputting voltage outputs of both ends of said piezo-electric element, and for giving a differential amplification signal, which is obtained by differentially amplifying the voltage outputs of both ends of said piezo-electric element, as a sensor output, said amplifier circuit having a first non-inverting amplifier circuit for non-inversion amplifying one voltage of said piezo-electric element, a second non-inverting amplifier circuit for non-inversion amplifying the other voltage of said piezo-electric element, and a differential amplifier circuit for differentially amplifying outputs of said first and second non-inverting amplifier circuits;

a bias resistor circuit provided at an input side of said amplifier circuit;

a capacitor inserted in parallel with said piezo-electric element in order to lower a lower cut-off frequency without increasing resistance values of said bias resistor circuit;

a single temperature compensation element for adjusting gains of the first and second non-inverting amplifier circuits of said amplifier circuit so that an output-temperature characteristic of said piezo-electric element is compensated; and a reference voltage circuit for giving a reference potential to said amplifier circuit and said bias resistor circuit.

2. The acceleration sensor of claim 1, wherein:

said first non-inverting amplifier circuit has a first operational amplifier, one input terminal of the first operational amplifier being connected to one end of said piezo-electric element, and the other input terminal of the first operational amplifier being connected to an output terminal of the first operational amplifier through a first resistor;

said second non-inverting amplifier circuit has a second operational amplifier, one input terminal of the second operational amplifier being connected to the other end of said piezo-electric element, and the other input terminal of the second operational amplifier being connected to an output terminal of the second operational amplifier through a second resistor; and said temperature compensation element is inserted between the other input terminal of the first operational amplifier and the other input terminal of the second operational amplifier, and decreases the gains of the first and second non-inverting amplifier circuits when temperature rises and increases the gains when temperature drops.

3. The acceleration sensor of claim 2, wherein said first and second resistors are set so that a drop in voltage outputs of said piezo-electric element due to the parallel insertion of said capacitor to said piezo-electric element can be supplemented by the gains of said first and second non-inverting amplifier circuits.

4. The acceleration sensor of claim 1, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and gives the reference potential to at least said differential amplifier circuit by way of the reference voltage buffer amplifier.

5. The acceleration sensor of claim 1, having a sensor power supply line to which a constant voltage is supplied from outside, wherein an output terminal of said amplifier circuit is grounded through an output resistor, and the sensor output given from said amplifier circuit is output as current variations in said sensor power supply line.

6. The acceleration sensor of claim 1, having a sensor power supply line to which a constant voltage is supplied from outside, a sensor output signal line for outputting the sensor output of said amplifier circuit, and a reference voltage signal line for outputting the reference potential of said reference voltage circuit, wherein the sensor output given from said amplifier circuit is output as a voltage signal by means of said sensor output signal line and said reference voltage signal line.

7. The acceleration sensor of claim 1, wherein said first and second non-inverting amplifier circuits and/or said differential amplifier circuit of said amplifier circuit has an integrating function, said amplifier circuit differentially amplifying and integrating the voltage outputs of both ends of said piezo-electric element, and giving an integrated differential amplification signal as the sensor output.

8. The acceleration sensor of claim 7, wherein:

said first non-inverting amplifier circuit has a first operational amplifier, one input terminal of the first operational amplifier being connected to one end of said piezo-electric element, and the other input terminal of the first operational amplifier being connected to an output terminal of the first operational amplifier through a parallel connection of a first resistor and a first capacitor; and said second non-inverting amplifier circuit has a second operational amplifier, one input terminal of the second operational amplifier being connected to the other end of said piezo-electric element, and the other input terminal of the second operational amplifier being connected to an output terminal of the second operational amplifier through a parallel connection of a second resistor and a second capacitor.

9. The acceleration sensor of claim 7, wherein said differential amplifier circuit has a third operational amplifier, one input terminal of the third operational amplifier being connected to an output terminal of said second non-inverting amplifier circuit through a third resistor and being also connected to said reference voltage circuit through a parallel connection of a fourth resistor and a third capacitor, and the other input terminal of the third operational amplifier being connected to an output terminal of said first non-inverting amplifier circuit through a fifth resistor and being also connected to an output terminal of the third operational amplifier through a parallel connection of a sixth resistor and a fourth capacitor.

10. The acceleration sensor of claim 1 further comprising:

a circuit base board, an acceleration sensor circuit which has said piezo-electric element, said amplifier circuit, said bias resistor circuit, said capacitor, said temperature compensation element and said reference voltage circuit being mounted on said circuit base board;

a metallic shielding case having a container shape with an opened upper face, said circuit base board being fixed to the upper face of said shielding case so that a face of said circuit base board having the acceleration sensor circuit becomes inside said shielding case; and a plastic housing having a container chamber which houses said shielding case, wherein said shielding case is formed so that a width of said shielding case in acceleration detecting directions is a little larger than a width of the container chamber of said housing, and side walls of said shielding case meeting at right angle to the acceleration detecting directions pressure-contact with an inside face of said container chamber.

11. The acceleration sensor of claim 1 further comprising:

a circuit base board, an acceleration sensor circuit which has said piezo-electric element, said amplifier circuit, said bias resistor circuit, said capacitor, said temperature compensation element and said reference voltage circuit being mounted on said circuit base board; and a plastic housing having a container chamber of which an inside face is covered with a metallic layer for shielding, wherein said circuit base board is fixed to an upper face of said container chamber so that a face of said circuit base board having the acceleration sensor circuit becomes inside said container chamber.

12. The acceleration sensor of claim 10, wherein a metallic layer for shielding is formed on a face opposite to the face of said circuit base board having the acceleration sensor circuit.

13. An acceleration sensor comprising:

a piezo-electric element for detecting an acceleration;

an amplifier circuit for inputting voltage outputs of both ends of said piezo-electric element, for differentially amplifying and integrating the voltage outputs of both ends, and for outputting an integrated differential amplification signal, said amplifier circuit having a first non-inverting amplifier circuit for non-inversion amplifying one voltage of said piezo-electric element, a second non-inverting amplifier circuit for non-inversion amplifying the other voltage of said piezo-electric element, and a differential amplifier circuit for differentially amplifying outputs of said first and second non-inverting amplifier circuits, said first and second non-inverting amplifier circuits and/or said differential amplifier circuit having the integrating function;

a bias resistor circuit provided at an input side of said amplifier circuit;

a capacitor inserted in parallel with said piezo-electric element in order to lower a lower cut-off frequency without increasing resistance values of said bias resistor circuit;

a single temperature compensation element for adjusting gains of said first and second non-inverting amplifier circuits of said amplifier circuit so that an output-temperature characteristic of said piezo-electric element is compensated;

a reference voltage circuit for giving a reference potential to said amplifier circuit and said bias resistor circuit; and at least one comparison circuit for inputting the integrated differential amplification signal of said amplifier circuit, for giving a comparison output based on the integrated differential amplification signal and a prescribed threshold value, and for giving the comparison output as a sensor output.

14. The acceleration sensor of claim 13, wherein the gains of said first and second non-inverting amplifier circuits are set so that a drop in voltage outputs of said piezo-electric element due to the parallel insertion of said capacitor to said piezo-electric element can be supplemented by the gains of said first and second non-inverting amplifier circuits.

15. The acceleration sensor of claim 13, wherein said reference voltage circuit has a reference voltage buffer amplifier for matching with output impedances of said first and second non-inverting amplifier circuits, and gives the reference potential to at least said differential amplifier circuit by way of the reference voltage buffer amplifier.

16. The acceleration sensor of claim 13, wherein said comparison circuit includes:

a comparator for inputting the integrated differential amplification signal of said amplifier circuit and a constant voltage giving the threshold value, for giving a first level signal when the integrated differential amplification signal is below the threshold value, and for giving a second level signal when the integrated differential amplification signal exceeds the threshold value; and a chattering prevention circuit for providing the second level signal as feedback to an input side of said comparator receiving the integrated differential amplification signal when the integrated differential amplification signal exceeds the threshold value.

17. The acceleration sensor of claim 13, having a first comparison circuit with a first threshold value and a second comparison circuit with a second threshold value different from the first threshold value, wherein a first and second comparison outputs are given as the sensor output based on comparison between the integrated differential amplification signal and the first and second threshold values.

18. The acceleration sensor of claim 16, having a sensor power supply line to which a constant voltage is supplied from outside, wherein said comparison circuit further includes a switching element inserted between said sensor power supply line and the ground, and said comparison output is output as current variations in said sensor power supply line by turning On/Off said switching element with said first and second level signals.

19. The acceleration sensor of claim 13 further comprising:

a circuit base board, an acceleration sensor circuit which has said piezo-electric element, said amplifier circuit, said bias resistor circuit, said capacitor, said temperature compensation element, said reference voltage circuit and said comparison circuit being mounted on said circuit base board;

a metallic shielding case having a container shape with an opened upper face, said circuit base board being fixed to the upper face of said shielding case so that a face of said circuit base board having the acceleration sensor circuit becomes inside said shielding case; and a plastic housing having a container chamber which houses said shielding case, wherein said shielding case is formed so that a width of said shielding case in acceleration detecting directions is a little larger than a width of the container chamber of said housing, and side walls of said shielding case meeting at right angle to the acceleration detecting directions pressure-contact with an inside face of said container chamber.

20. The acceleration sensor of claim 13 further comprising:

a circuit base board, an acceleration sensor circuit which has said piezo-electric element, said amplifier circuit, said bias resistor circuit, said capacitor, said temperature compensation element, said reference voltage circuit and said comparison circuit being mounted on said circuit base board; and a plastic housing having a container chamber of which an inside face is covered with a metallic layer for shielding, wherein said circuit base board is fixed to an upper face of said container chamber so that a face of said circuit base board having the acceleration sensor circuit becomes inside said container chamber.

21. An acceleration detecting system comprising:
an acceleration sensor provided in a front part of a vehicle, said acceleration sensor having
  a piezo-electric element for detecting an acceleration,
  an amplifier circuit for inputting voltage outputs of both ends of said piezo-electric element, and for giving a differential amplification signal, which is obtained by differentially amplifying the voltage outputs of both ends of said piezo-electric element, as a sensor output,
  a bias resistor circuit provided at an input side of said amplifier circuit,
  a capacitor inserted in parallel with said piezo-electric element in order to lower a lower cut-off frequency without increasing resistance values of said bias resistor circuit,
  temperature compensation means for adjusting gain of said amplifier circuit so that an output-temperature characteristic of said piezo-electric element is compensated,
  a reference voltage circuit for giving a reference potential to said amplifier circuit and said bias resistor circuit, and
  a sensor power supply line to which a constant voltage is supplied from outside,
  said acceleration sensor outputting the sensor output given from said amplifier circuit as current variations in said sensor power supply line;
a transmission cable of which one end is connected to said sensor power supply line; and
a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by detecting current variations in said unit power supply line.

22. The acceleration detecting system of claim 21, wherein said amplifier circuit of said acceleration sensor, which has an integrating function, differentially amplifies and integrates the voltage outputs of both ends of said piezo-electric element, and gives an integrated differential amplification signal as the sensor output.

23. The acceleration detecting system of claim 21, wherein said receiving circuit has:
  a current mirror circuit, inserted between said unit power supply line and said transmission cable, for giving a current output according to the current variations due to the sensor output of said acceleration sensor; and
  a detection resistor, inserted between an output side of said current mirror circuit and the ground, for outputting a voltage signal according to the current output of said current mirror circuit.

24. The acceleration detecting system of claim 21, wherein said receiving circuit has:
  a transistor, at its base being connected through a first resistor to said unit power supply line and being also connected to said transmission cable, and at its emitter being connected through a second resistor to said unit power supply line, said transistor giving a collector current according to the current variations due to the sensor output of said acceleration sensor; and
  a detection resistor, inserted between a collector of said transistor and the ground, for outputting a voltage signal according to the collector current of said transistor.

25. The acceleration detecting system of claim 21, wherein said receiving circuit has:
  a resistor, at its one end being connected to said transmission cable, and at its other end being connected to said unit power supply line;
  a constant-current circuit, when a current flowing through said resistor varies by the sensor output of said acceleration sensor, for giving a current output according to variations of the current flowing through said resistor; and
  a detection resistor, inserted between an output side of said constant-current circuit and the ground, for outputting a voltage signal according to the current output of said constant-current circuit.

26. An acceleration detecting system comprising:
an acceleration sensor provided in a front part of a vehicle, said acceleration sensor having
  a piezo-electric element for detecting an acceleration,
  an amplifier circuit for inputting voltage outputs of both ends of said piezo-electric element, for differentially amplifying and integrating the voltage outputs of both ends, and for outputting an integrated differential amplification signal,
  a bias resistor circuit provided at an input side of said amplifier circuit,
  a capacitor inserted in parallel with said piezo-electric element in order to lower a lower cut-off frequency without increasing resistance values of said bias resistor circuit,
  temperature compensation means for adjusting gain of said amplifier circuit so that an output-temperature characteristic of said piezo-electric element is compensated,
  a reference voltage circuit for giving a reference potential to said amplifier circuit and said bias resistor circuit,
  at least one comparison circuit for inputting the integrated differential amplification signal of said amplifier circuit, for giving a comparison output based on the integrated differential amplification signal and a prescribed threshold value, and for giving the comparison output as a sensor output, and
  a sensor power supply line to which a constant voltage is supplied from outside,
  said acceleration sensor outputting the sensor output given from said comparison circuit as current variations in said sensor power supply line;
a transmission cable of which one end is connected to said sensor power supply line; and
a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by detecting current variations in said unit power supply line.

27. An acceleration detecting system comprising:
an acceleration sensor provided in a front part of a vehicle, said acceleration sensor having
  a piezo-electric element for detecting an acceleration,
  an amplifier circuit for inputting voltage outputs of both ends of said piezo-electric element, and for giving a differential amplification signal, which is obtained by differentially amplifying the voltage outputs of both ends of said piezo-electric element, as a sensor output, a bias resistor circuit provided at an input side of said amplifier circuit, a capacitor inserted in parallel with said piezo-electric element in order to lower a lower cut-off frequency without increasing resistance values of said bias resistor circuit, temperature compensation means for adjusting gain of said amplifier circuit so that an output-temperature characteristic of said piezo-electric element is compensated, a reference voltage circuit for giving a reference potential to said amplifier circuit and said bias resistor circuit, a sensor power supply line to which a constant voltage is supplied from outside, a sensor output signal line for outputting the sensor output of said amplifier circuit, and a reference voltage signal line for outputting the reference potential of said reference voltage circuit;

a transmission cable of which one end is connected to said sensor power supply line, said sensor output signal line and said reference voltage signal line; and a receiving circuit, being provided in a room of the vehicle, being connected to the other end of said transmission cable, and having a unit power supply line which supplies the constant voltage to said sensor power supply line, said receiving circuit receiving the sensor output of said acceleration sensor by differentially amplifying the sensor output of said acceleration sensor and the reference potential.

* * * * *